(12) United States Patent
Ishikawa et al.

(10) Patent No.: US 8,009,305 B2
(45) Date of Patent: Aug. 30, 2011

(54) METHOD, PROGRAM, AND APPARATUS FOR DETECTING A COPY-PROHIBITED DOCUMENT AND PROHIBITING A REPRODUCTION OF THE DETECTED COPY PROHIBITED DOCUMENT

(75) Inventors: Masaaki Ishikawa, Tokyo (JP); Takashi Saitoh, Kanagawa-ken (JP); Haike Guan, Kanagawa-ken (JP); Hiroshi Shimura, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 1788 days.

(21) Appl. No.: 10/922,924

(22) Filed: Aug. 23, 2004

(65) Prior Publication Data
US 2005/0041263 A1    Feb. 24, 2005

(30) Foreign Application Priority Data

Aug. 21, 2003  (JP) ................ 2003-297565
Nov. 7, 2003   (JP) ................ 2003-378508
Nov. 19, 2003  (JP) ................ 2003-389572

(51) Int. Cl.
G06K 15/00   (2006.01)
H04N 1/40    (2006.01)
G06K 9/46    (2006.01)

(52) U.S. Cl. .............. 358/1.14; 358/1.18; 358/3.28; 382/203

(58) Field of Classification Search ............. 358/1.14, 358/3.28
See application file for complete search history.

(56) References Cited

U.S. PATENT DOCUMENTS

| 5,647,010 | A  | * | 7/1997  | Okubo et al. ........... 382/100 |
| 5,748,772 | A  | * | 5/1998  | Moro et al. ........... 382/167 |
| 5,798,844 | A  |   | 8/1998  | Sakano et al. |
| 6,384,935 | B1 |   | 5/2002  | Yamazaki |
| 6,470,096 | B2 | * | 10/2002 | Davies et al. ........... 382/203 |
| 6,559,968 | B1 | * | 5/2003  | Keronen ........... 358/1.18 |
| 2002/0135810 | A1 | * | 9/2002 | Ikenoue et al. ........... 358/3.28 |
| 2003/0035151 | A1 |  | 2/2003 | Kurita et al. |
| 2003/0120612 | A1 | * | 6/2003 | Fujisawa et al. ........... 705/73 |

(Continued)

FOREIGN PATENT DOCUMENTS

EP   1 227649 A2   7/2002

(Continued)

OTHER PUBLICATIONS

A European Office Action in corresponding EP application No. EP 04 255 013.7.

Primary Examiner — Twyler L Haskins
Assistant Examiner — Vincent Rudolph
(74) Attorney, Agent, or Firm — Dickstein Shapiro LLP

(57) ABSTRACT

An image processing apparatus includes a first memory, a data detector, a second memory, a third memory, and a determiner. The first memory stores a reference pattern including a plurality of reference basic units, each of which represents specific minimal information, is superposed on input image data, and represents specific entire information. The data detector detects a basic unit in the input image data based on the reference basic unit included in the reference pattern stored in the first memory. The second memory accumulates a number of basic units detected by the data detector. The third memory stores a predetermined value. The determiner determines whether the number of basic units detected by the data detector and stored in the second memory is equal to the predetermined value stored in the third memory.

20 Claims, 27 Drawing Sheets

U.S. PATENT DOCUMENTS

| | | |
|---|---|---|
| 2003/0179412 A1* | 9/2003 | Matsunoshita ............ 358/3.28 |
| 2004/0084894 A1* | 5/2004 | Fan et al. .................... 283/72 |
| 2004/0121131 A1* | 6/2004 | Yamaguchi et al. ....... 428/195.1 |

FOREIGN PATENT DOCUMENTS

| | | |
|---|---|---|
| JP | 06-125459 | 5/1994 |
| JP | 07-076317 | 3/1995 |
| JP | 07-087309 | 3/1995 |
| JP | 7-1155537 | 5/1995 |
| JP | 09-164739 | 6/1997 |
| JP | 2000-196585 | 7/2000 |
| JP | 2001-086330 | 3/2001 |
| JP | 2001-111816 | 4/2001 |
| JP | 2001-117172 | 4/2001 |
| JP | 2001-197297 | 7/2001 |
| JP | 2002-504272 | 2/2002 |
| JP | 2002-232696 | 8/2002 |
| JP | 2002-259249 | 9/2002 |
| JP | 2002-305646 | 10/2002 |
| JP | 2003-060890 | 2/2003 |
| JP | 2003-101762 | 4/2003 |
| JP | 2003-205661 | 7/2003 |
| JP | 2003-209676 | 7/2003 |
| JP | 2003-283714 | 10/2003 |

* cited by examiner

METHOD, PROGRAM, AND APPARATUS FOR DETECTING A COPY-PROHIBITED DOCUMENT AND PROHIBITING A REPRODUCTION OF THE DETECTED COPY PROHIBITED DOCUMENT

This patent specification is based on Japanese patent applications, No. 2003-389572 filed on Nov. 19, 2003, No. 2003-297565 filed on Aug. 21, 2003, and No. 2003-378508 filed on Nov. 7, 2003, in the Japan Patent Office, the entire contents of which are incorporated by reference herein.

BACKGROUND OF THE INVENTION

1. Field of the Invention

The present invention relates to a method, program, and apparatus for copy protection, and more particularly to a method, program, and apparatus for detecting a copy-prohibited document and prohibiting a reproduction of the detected copy-prohibited document. The present invention also relates to a computer readable storage medium storing the above-mentioned program for detecting a copy-prohibited document and prohibiting a reproduction of the detected copy-prohibited document.

2. Discussion of the Background

With recent improvements in image processing and image forming technologies, it has become possible that a high-tech digital color copying apparatus, for example, can reproduce a monetary document even with a high fidelity such that the reproduced image is hardly distinguished from the original image. Such monetary document is a paper currency, a security, and the like, for example, and will not normally be placed as an object of copying since an authorized currency creation is illegal. Therefore, the high-tech digital color copying apparatus is needed to be provided with a feature of prohibiting a reproduction of a copy-prohibited document such as a monetary document, a confidential document, etc. With this feature, a copy-prohibited document may entirely be prohibited from being reproduced or can be reproduced into a nonreadable image, for example.

In offices, there are many confidential documents which are not necessarily monetary documents but are prohibited from being copied from a viewpoint of trade secrets. These confidential documents are also needed to be prohibited from being copied with the high-tech digital color copying apparatuses.

Under these circumstances, various inventions associated with the above-mentioned high-tech digital color copying apparatus have been conducted to attempt to restrict the capability of an image reproduction with a high fidelity.

Japanese Laid-Open Unexamined Patent Application Publication, No. 06-125459 describes a technique for recognizing a special document such as currency, a security, and so on by comparing input image data with a prestored specific mark by pattern matching and judging that the input image data is a special document when the input image data is recognized as matching the prestored specific mark. Japanese Laid-Open Unexamined Patent Application Publication, No. 2001-086330 also describes a similar technique. If an input original is judged as a special document easily in this way, a reproduction of this document can readily be prohibited.

This technique accordingly requires a storage of reference pattern data to be applied to the copy protection for a specific document. However, it would be difficult to apply this reference pattern data which is the fixed data to the copy protection for an indefinite number of general confidential documents.

As another example, Japanese Laid-Open Unexamined Patent Application Publication, No. 07-036317 describes a technique for recognizing a confidential document dealt as a copy-prohibited document by detecting a specific mark such as "CONFIDENTIAL," for example, printed on this confidential document indicative of its confidentiality. A print of such a specific mark indicating the document confidentiality in a confidential document is a common practice and the above-mentioned publication uses it. When an input original is judged as a special document easily in this way, a reproduction of this document can readily be prohibited. Japanese Laid-Open Unexamined Patent Application Publication, No. 07-087309 also describes a similar method.

However, when a confidential document has a print of a specific confidential mark such as "CONFIDENTIAL," for example, a copy of this confidential document can easily be made by avoiding a print of the specific confidential mark by hiding it with a piece of paper, for example. Thus, the copy protection fails to protect the confidential document from copying.

Japanese Laid-Open Unexamined Patent Application Publication, No. 09-164739 also describes a similar technique for restricting a copying of document by embedding a watermark in an original image which is desired to be protected from copying. This technique uses a paper sheet having a specific background image to which an original image is attached. The specific background image includes a background dot pattern having a base area and a message area. From its nature, the background dot pattern is inconspicuous in comparison with the original image and therefore it does not cause a problem when reading the original image. This technique, however, causes the background dot pattern to appear when the original image having this background dot pattern is copied. The background dot pattern of this technique is provided with a word of warning such as an "anti-copy," for example, so that a copy of this original document is recognized easily at a glance as a confidential document which is desired to be protected from copying. Therefore, this technique has a psychological effect of restricting against the copying of document.

However, this technique produces the above-mentioned psychological effect only after the copy is made. Therefore, for the persons who do not care about the rise of the background dot pattern, the copy protection does not work at all.

SUMMARY OF THE INVENTION

In view of the foregoing, it is an object of the present invention to provide a novel image processing apparatus which securely protects a reproduction of a copy-prohibited document.

Another object of the present invention is to provide a novel recording medium capable of securely protecting reproduction of copy-prohibited information.

Another object of the present invention is to provide a novel image processing method which securely protects reproduction of a copy-prohibited document.

Another object of the present invention is to provide a novel computer program product stored on a computer readable medium for executing an image processing method of securely protecting reproduction of a copy-prohibited document.

Another object of the present invention is to provide a novel computer readable medium storing computer instructions for executing an image processing method of securely protecting reproduction of a copy-prohibited document.

To achieve the above-mentioned objects, in one embodiment, a novel image processing apparatus includes a first memory, a data detector, a second memory, a third memory, and a determiner. The first memory stores a reference pattern which includes a plurality of reference basic units, each of which represents specific minimal information, is superposed on input image data, and represents specific entire information. The data detector is configured to detect a basic unit in the input image data based on the reference basic unit included in the reference pattern stored in the first memory. The second memory accumulates a number of basic units detected by the data detector. The third memory stores a predetermined value. The determiner is configured to determine whether the number of basic units detected by the data detector and stored in the second memory is equal to the predetermined value stored in the third memory.

The specific entire information represented by the reference pattern may cause the image processing apparatus to perform a predetermined operation when the image processing apparatus reads the input image data and analyzes the specific entire information superposed on the input image data, and the reference pattern may be an image aggregation including the plurality of the basic patterns each of which includes a plurality of minimal elements.

The image aggregation may be generated by superposing the minimal elements of the basic units over each other.

The image aggregation may include dummy patterns.

The plurality of the basic patterns included in the image aggregation may be generated in a way such that 360 degrees is divided by a positive integer into a specific angle and the plurality of the basic patterns are in turn rotated by the specific angle.

The image aggregation may include a plurality of basic patterns turned by a predetermined angle; a pattern unit representing the specific minimal information is made of at least one of the plurality of basic patterns turned by the predetermined angle.

Each of the plurality of minimal elements may be a dot.

The predetermined operation may be an operation for prohibiting an output of an image according to the input image data or prohibiting reproduction of an image according to the input image data.

Further, a novel recording medium includes an original image and a reference pattern. The reference pattern includes a plurality of reference basic units, each of which represents specific minimal information, is superposed on the original image, and represents specific entire information. In this configuration, the specific information represented by the reference pattern causes an image processing apparatus to perform a predetermined operation when the image processing apparatus reads the original image and analyzes the specific entire information superposed on the original image, and the reference pattern is an image aggregation including the plurality of the basic patterns each of which includes a plurality of minimal elements.

The image aggregation may be generated by superposing the minimal elements of the basic units over each other.

The image aggregation may include dummy patterns.

The plurality of the basic patterns included in the image aggregation may be generated in a way such that 360 degrees is divided by a positive integer into a specific angle and the plurality of the basic patterns are in turn rotated by the specific angle.

The image aggregation may include a plurality of basic patterns turned by a predetermined angle; a pattern unit representing the specific minimal information is made of at least one of the plurality of basic patterns turned by the predetermined angle.

Each of the plurality of minimal elements may be a dot.

The predetermined operation may be an operation for prohibiting an output of an image according to the input image data.

The predetermined operation may be an operation for prohibiting reproduction of an image according to the input image data.

Further, a novel image processing apparatus capable of performing at least one of a function of copying, faxing, file transfer e-mailing, image-data network transmission, and image data accumulation includes an image reading mechanism, a dot pattern detecting mechanism, a dot pattern determining mechanism, and an output regulating mechanism. The image reading mechanism is configured to read an original image to obtain image data from the original image. The dot pattern detecting mechanism is configured to detect a dot pattern embedded in one of a background image and a front image included in the image data read from the original image by the image reading mechanism. The dot pattern determining mechanism is configured to compare the dot pattern detected by the dot pattern detecting mechanism with a reference dot pattern previously stored in a memory to determine whether the detected dot pattern is identified as the reference dot pattern. The output regulating mechanism is configured to regulate the at least one function of copying, faxing, file transfer e-mailing, image-data network transmission, and image data accumulation in outputting the image data including the detected dot pattern when the dot pattern determining mechanism determines that the detected dot pattern is identified as the reference dot pattern.

The output regulating mechanism may perform a data scrambling operation relative to the image data including the detected dot pattern determined as being identified as the reference dot pattern.

The output regulating mechanism may stop outputting the image data including the detected dot pattern through the at least one function of copying, faxing, file transfer e-mailing, image-data network transmission, and image data accumulation.

The output regulating mechanism may perform a data scrambling operation relative to the image data including the detected dot pattern determined as being identified as the reference dot pattern and outputs an image through the function of copying when a copying mode is selected for reproducing the image data read from the original image by the image reading mechanism.

The output regulating mechanism may perform a data scrambling operation relative to the image data including the detected dot pattern determined as being identified as the reference dot pattern and outputs an image through the function of image-data network transmission when a network transmission mode is selected for transmitting the image data read from the original image by the image reading mechanism through a network to an external terminal.

The output regulating mechanism may perform a data scrambling operation relative to the image data including the detected dot pattern determined as being identified as the reference dot pattern and outputs an image through the function of faxing when a fax mode is selected for transmitting through facsimile the image data read from the original image by the image reading mechanism.

The output regulating mechanism may perform a data scrambling operation relative to the image data including the detected dot pattern determined as being identified as the reference dot pattern and outputs an image through the function of file transfer e-mailing when an e-mailing mode is selected for e-mailing the image data read from the original image by the image reading mechanism, as a file to an external terminal.

The output regulating mechanism may perform a data scrambling operation relative to the image data including the detected dot pattern determined as being identified as the reference dot pattern and outputs an image through the function of image data accumulation when a data accumulation mode is selected for accumulating the image data read from the original image by the image reading mechanism.

Further, the present invention provides a novel computer program product stored on a computer readable storage medium for, when run on an image processing apparatus capable of performing at least one of a function of copying, faxing, file transfer e-mailing, image-data network transmission, and image data accumulation, carrying out an image processing method which includes the steps of reading, detecting, comparing, and regulating. The reading step reads an original image to obtain image data from the original image. The detecting step detects a dot pattern embedded in one of a background image and a front image included in the image data read from the original image by the reading step. The comparing step compares the dot pattern detected by the dot pattern detecting mechanism with a reference dot pattern previously stored in a memory to determine whether the detected dot pattern is identified as the reference dot pattern. The regulating step regulates the at least one function of copying, faxing, file transfer e-mailing, image-data network transmission, and image data accumulation in outputting the image data including the detected dot pattern when the determining step determines that the detected dot pattern is identified as the reference dot pattern.

The regulating step may perform a data scrambling operation relative to the image data including the detected dot pattern determined as being identified as the reference dot pattern.

Further, the present invention provides a novel computer readable storage medium storing a computer program product for, when run on an image processing apparatus capable of performing at least one of a function of copying, faxing, file transfer e-mailing, image-data network transmission, and image data accumulation, carrying out an image processing method which includes the steps of reading, detecting, comparing, and regulating. The reading step reads an original image to obtain image data from the original image. The detecting step detects a dot pattern embedded in one of a background image and a front image included in the image data read from the original image by the reading step. The comparing step compares the dot pattern detected by the dot pattern detecting mechanism with a reference dot pattern previously stored in a memory to determine whether the detected dot pattern is identified as the reference dot pattern. The regulating step regulates the at least one function of copying, faxing, file transfer e-mailing, image-data network transmission, and image data accumulation in outputting the image data including the detected dot pattern when the determining step determines that the detected dot pattern is identified as the reference dot pattern.

The regulating step may perform a data scrambling operation relative to the image data including the detected dot pattern determined as being identified as the reference dot pattern.

Further, the present invention provides a novel method of image forming in an image processing apparatus capable of performing at least one function of copying, faxing, file transfer e-mailing, image-data network transmission, and image data accumulation, including the steps of reading, detecting, comparing, and regulating. The reading step reads an original image to obtain image data from the original image. The detecting step detects a dot pattern embedded in one of a background image and a front image included in the image data read from the original image by the reading step. The comparing step compares the dot pattern detected by the dot pattern detecting mechanism with a reference dot pattern previously stored in a memory and determines whether the detected dot pattern is identified as the reference dot pattern. The regulating step regulates the at least one function of copying, faxing, file transfer e-mailing, image-data network transmission, and image data accumulation in outputting the image data including the detected dot pattern when the determining step determines that the detected dot pattern is identified as the reference dot pattern.

The regulating step may perform a data scrambling operation relative to the image data including the detected dot pattern determined as being identified as the reference dot pattern.

BRIEF DESCRIPTION OF THE DRAWINGS

A more complete appreciation of the disclosure and many of the attendant advantages thereof will be readily obtained as the same becomes better understood with reference to the following detailed description when considered in connection with the accompanying drawings, wherein.

DETAILED DESCRIPTION OF PREFERRED EMBODIMENTS

Figure 1:
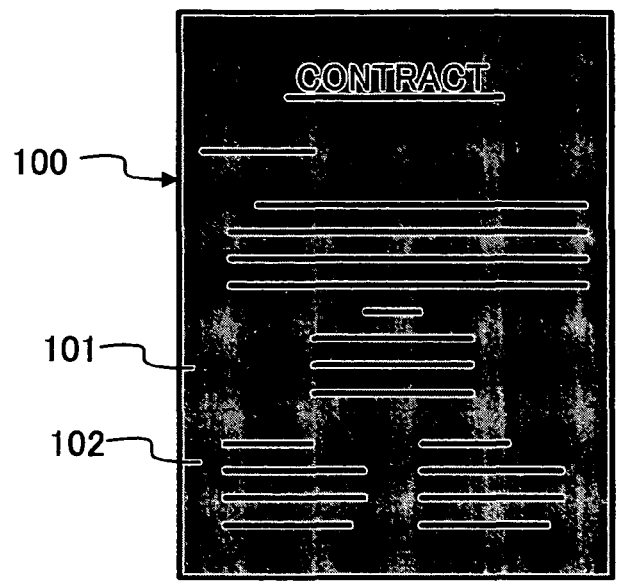
FIG. 1 is an illustration for explaining an original image of an exemplary contract sheet.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIGS. 1-5B, a description is made for a background dot pattern or an anti-copy watermark used by an image processing apparatus according to an exemplary embodiment of the present invention for a copy protection system, for example.

Figure 2:
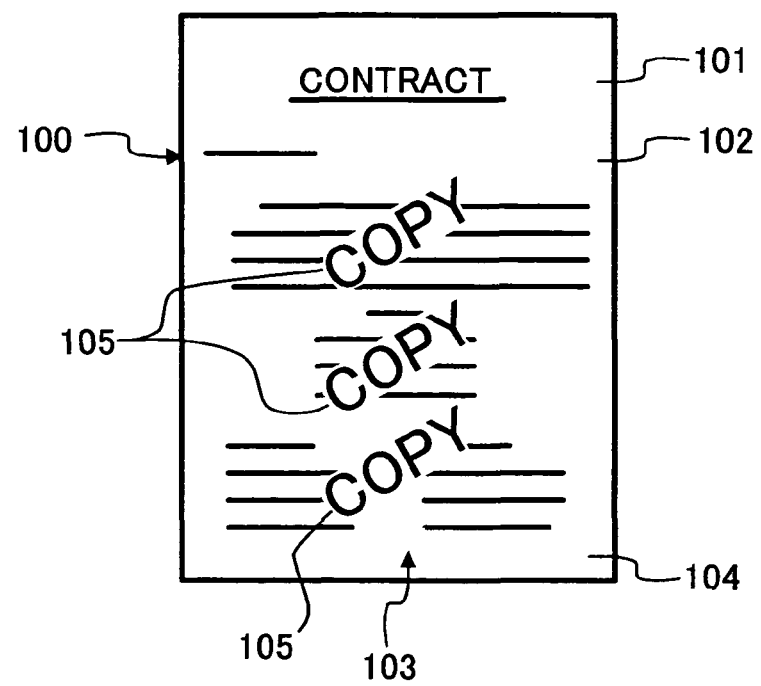
FIG. 2 is an illustration for explaining an exemplary reproduction of the contract sheet of FIG. 1 in which a background dot pattern made as an anti-copy watermark pattern embedded in the original image of the contract sheet appears.
Figure 3:
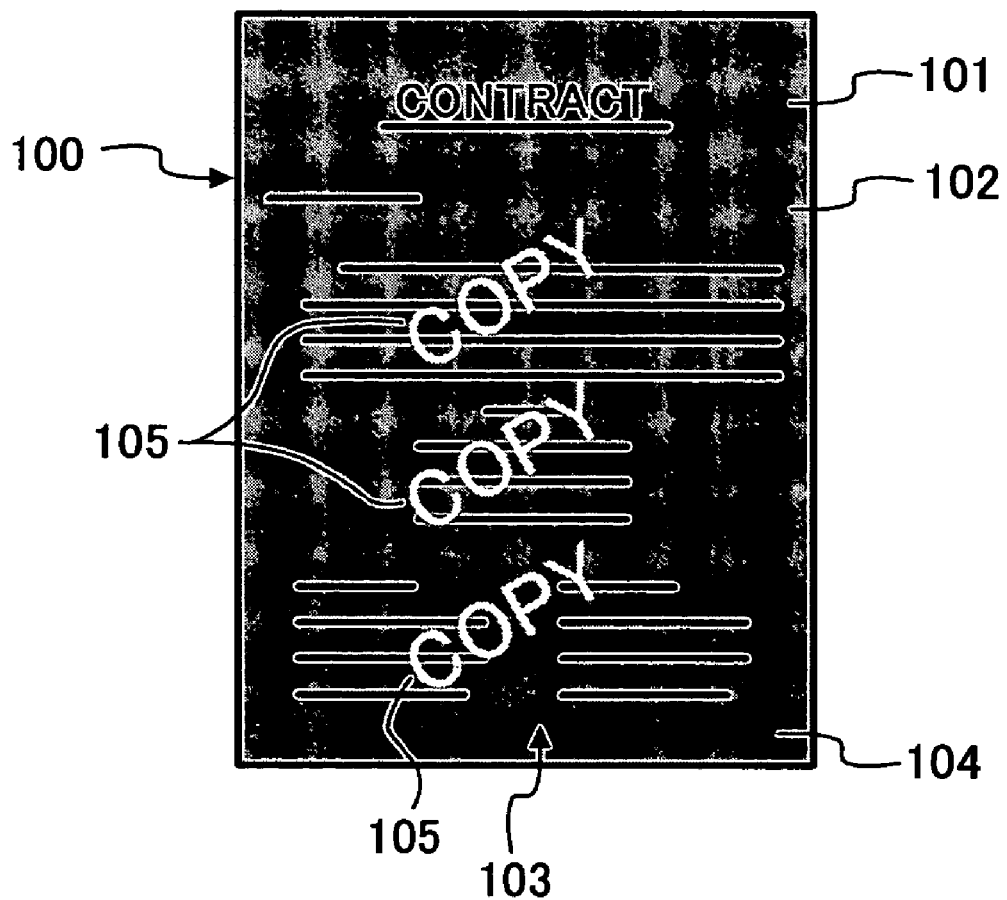
FIG. 3 is an illustration for explaining another exemplary reproduction of the contract sheet of FIG. 1 in which a background dot pattern made as an anti-copy watermark pattern embedded in the original image of the contract sheet appears.

FIG. 1 shows a contract sheet 100 as an example of an anti-copy original document in order to demonstrate one example of a background copy arrangement for allowing a desired part in a background to be copied and other parts in the background to not be copied, for example. The contract sheet 100 includes an original image 101 indicating a specific contract and an original sheet 102 on which the original image 101 is printed. FIG. 2 shows one exemplary copy of the contract sheet 100. In the copy of FIG. 2, a background dot pattern 103 embedded as a background dot pattern in the surface of the original sheet 102 is brought out and appears as a plurality of words "COPY" together with the original image 101. The background dot pattern 103 includes a base area 104 and a plurality of message areas 105. FIG. 3 shows another exemplary copy of the contract sheet 100.

Alternatively, the background dot pattern 103 can be added to the surface of the original sheet 102 when the original image 101 is formed thereon, instead of being previously embedded in the surface of the original sheet 102.

In the background dot pattern 103, the base area 104 represents a background area which is a major portion of the background dot pattern 103. The message areas 105 are the areas distributed within the base area 104 for expressing messages such as the word "COPY," for example. Of course, any other words, phrases, letters, symbols, etc. can be expressed in the message areas 105. The base area 104 and the message areas 105 are not separated based on a structural difference from each other, but are separated based on visual value judgments.

When a copy is made from the contract sheet 100, having the original image 101 printed on the original sheet 102, a part of the background dot pattern 103, that is, either the base area 104 or the message areas 105, appears together with the original image 101. In one case, as illustrated in FIG. 2, the images in the message areas 105 show up and, as a result, the words "COPY" appear in a solid character form. In another case, as illustrated in FIG. 3, the base area 104 shows up and, as a result, the words "COPY" appear in an outline character form.

That is, one of the images in the base area 104 and the message areas 105 is not susceptible to copying (i.e., hereinafter "made against copying"), and the other one of the images in the base area 104 and the message areas 105 is made susceptible to copying. In the copy of FIG. 2, the image in the base area 104 of the background dot pattern 103 is made against copying and the images in the message areas 105 are made susceptible to copying, so that the image of the base area 104 shows up, i.e., the letters "COPY" appear in the solid form. On the other hand, in the copy of FIG. 3, the image in the base area 104 is made susceptible to copying and the images in the message areas 105 are made against copying, so that the image of the message areas 105 show up, i.e., the letters "COPY" appear in the outline character form.

Figure 4A:
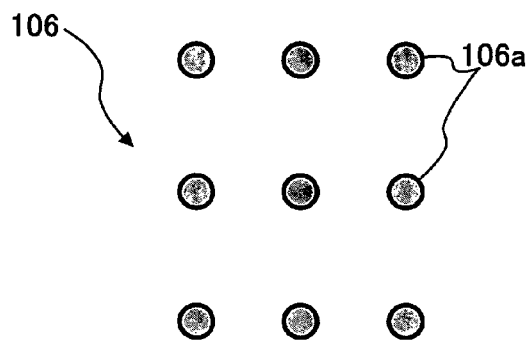
FIGS. 4A and 4B are enlarged illustrations of the background dot pattern of FIG. 3.
Figure 4B:
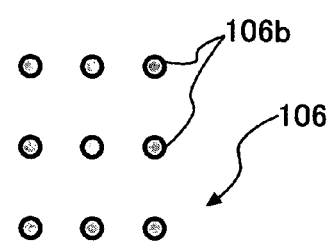
Figure 5A:
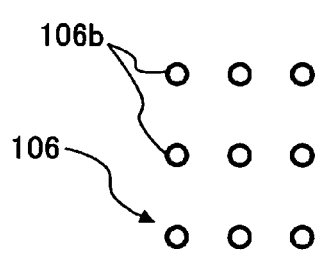
FIGS. 5A and 5B are enlarged illustrations of the background dot pattern of FIG. 2.
Figure 5B:
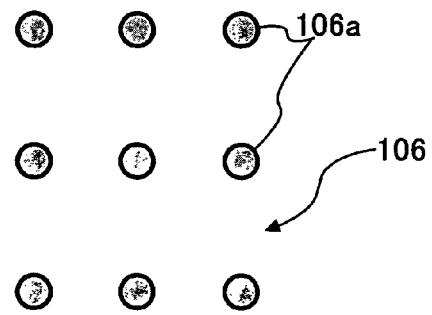

FIGS. 4A and 4B illustrate portions of the base area 104 and the message area 105, respectively, in an enlarged form with respect to the background dot pattern 103 shown in FIG. 3. In contrast, FIG. 5A illustrates a portion of the base area 104 and FIG. 5B illustrates a portion of the message area 105 with respect to background dot pattern 103 shown in FIG. 2. The background dot pattern 103 is made of dots 106 which are classified according to size into groups of dots 106a with a relatively large dot size, as illustrated in FIGS. 4A and 5B, and dots 106b with a relatively small dot size, as illustrated in FIGS. 4B and 5A; the dots 106a have a sufficiently large size to be copied and the dots 106b have an sufficiently small size so as not be copied (i.e., against copying). That is, in the background dot pattern 103 of FIG. 2, the image in the base area 104 is made of the small-sized dots 106*b* and the images in the message areas 105 are made of the large-sized dots 106*a*, as in the case shown in FIGS. 5A and 5B. When such background dot pattern 103 added to the original image 101 is copied, the images in the message areas 105 show up and, as a result, the letters "COPY" appear in a solid character form. In contrast to it, in FIG. 3, the image in the base area 104 is made of the large-sized dots 106*a* and the images in the message areas 105 are made of the small-sized dots 106*b*, as in the case shown in FIGS. 4A and 4B. That is, as a result of a copy operation, the images in the base area 104 shows up and the letters "COPY" appear in an outline character form.

As an alternative to dot patterns, it is possible to use different patterns such as, for example, a thin line pattern, a specific design pattern, and so forth to form images in the base area 104 and the message areas 105 of the background dot pattern 103.

The present invention arranges the base area 104 or the message areas 105 into a pattern that contains characteristic quantitative information representing a pattern characteristic of image data read from the original image 101. Accordingly, each of the base area 104 and the message areas 105 has specific information. That is, such pattern characteristic of the image data can be used as a piece of specific information. For example, when the image that shows up is formed of dots 106, as described above, it is expressed by a characteristic such as a size, a density (i.e., a number of dots per unit area), or the like. When the image showing up is formed of thin lines, it is expressed by a characteristic of a width of the lines, for example. When the image showing up is formed of specific patterns, it can be expressed by a characteristic of the specific pattern, for example. In embodiments described below, the dot pattern forming the base area 104 or the message areas 105 which shows up is designed to include characteristic quantitative information so as to represent meaningful specific information.

As an alternative, it is also possible to arrange the image in the base area 104 or the message areas 105 which does not show up, into a pattern that contains characteristic quantitative information. It is further possible to arrange both the image in the base area 104, shown up, and the image in the message areas 105, not shown up, into patterns that respectively contain characteristic quantitative information. That is, when at least one of the images in the base area 104 and the message areas 105, which are either embedded in the original sheet 102 or formed during the time the original image 101 is formed, is computer-readable data, these images can be handled as data expressed as respective characteristic quantitative information when the original image 101 printed on the original sheet 102 is read.

It is also possible to apply a different background dot pattern. For example, the pattern of the base area 104 alone or the message areas 105 alone can be applied as an alternative background dot pattern. Such a background dot pattern made of the base area 104 alone or the message areas 105 alone is either embedded in the original sheet 102 or formed during the time an original image including the pattern is formed. This singular background dot pattern can also be arranged into a pattern that contains characteristic quantitative information if such background dot pattern is computer-readable.

Figure 6A:
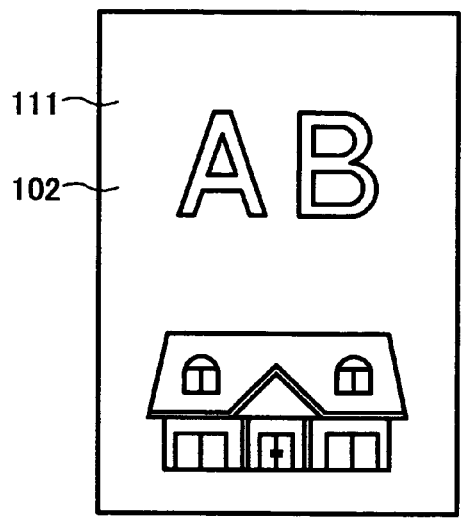
FIGS. 6A and 6B are illustrations of an exemplary expression of another image with a background dot pattern using single-sized dots.
Figure 6B:
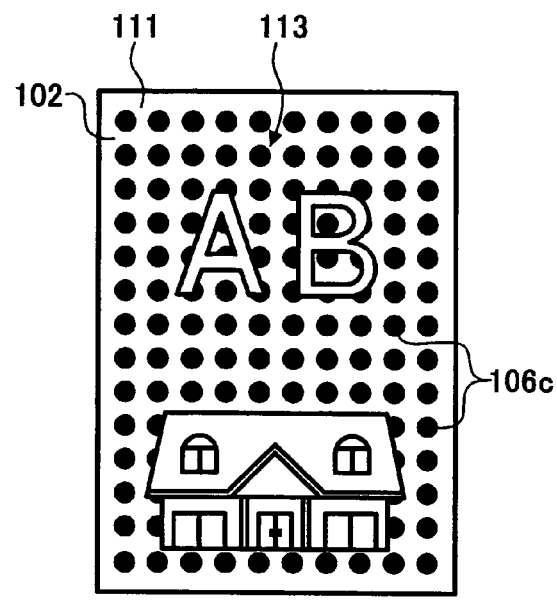
Figure 7A:
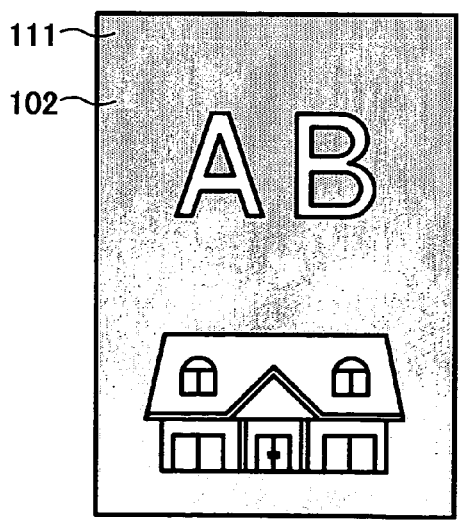
FIGS. 7A and 7B are illustrations of another exemplary expression of the image of FIGS. 6A and 6B.
Figure 7B:
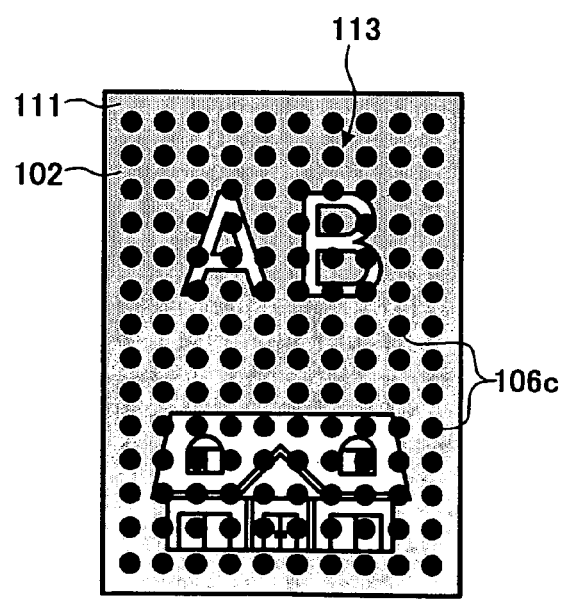

Referring to FIGS. 6A-7B, additional image examples prepared for the background copy arrangement according to the present invention are explained. As shown in both combinations of FIGS. 6A and 6B and FIGS. 7A and 7B, the original sheet 102 has an original image 111 showing letters "AB" and an illustration of a "house" underneath the letters "AB." Both FIGS. 6B and 7B show a mixed image of the original image 111 and a background dot pattern 113 made up with a plurality of single-sized dots 106*c*. In addition, the original image 111 is arranged in front of the background dot pattern 113 in FIG. 6B but is arranged under the background dot pattern 113 in FIG. 7B. The background dot patterns 113 of FIGS. 6B and 7B can be viewed as a pattern made of the base area 104 alone without having the message area 105 or the message area 105 alone without having the base area 104. These background dot patterns can be processed as characteristic quantitative information as long as these patterns are properly read and distinguished as data from the original image 111.

The above-described background dot patterns are a type of pattern in that characteristic quantitative information is determined based on relationships among the dots that are common in size. More specifically, the characteristic quantitative information applied to the background dot-patterns shown in FIGS. 2-7B are a dot density (i.e., a dot number in a unit area) and a dot distance between two adjacent dots, which are described below in more detail.

To determine the characteristic quantity of a background dot pattern, the dot density of the background dot pattern is sought by counting a number of dots in a unit area of the background dot pattern and verifying the counted dot number with a predetermined threshold value which determines a level of erroneous dot detection or omission. The characteristic quantity of the background dot pattern is then determined based on the dot density obtained. Erroneous dot detection or omission will easily occur when the threshold value is relatively small, but it will not easily occur when the threshold value is relatively large.

The background dot pattern 113 represented in FIG. 6B has some portions which are hidden under the original image 111 and therefore the dots 106*c* in the hidden portion cannot be detected. On the other hand, the background dot pattern 113 represented in FIG. 7B overlays the original image 111 and has no portion hidden under the original image 111; however, the dots 106*c* superimposed over the original image 111 may not easily be detected. In other words, the detection of dot number, i.e., the dot density, depends on the figure of the original image 111. Therefore, when the characteristic quantity of a pattern is determined based on the dot density (i.e., the dot number) and a predetermined threshold value, erroneous dot detection or omission may likely occur to some extent.

Figure 8:
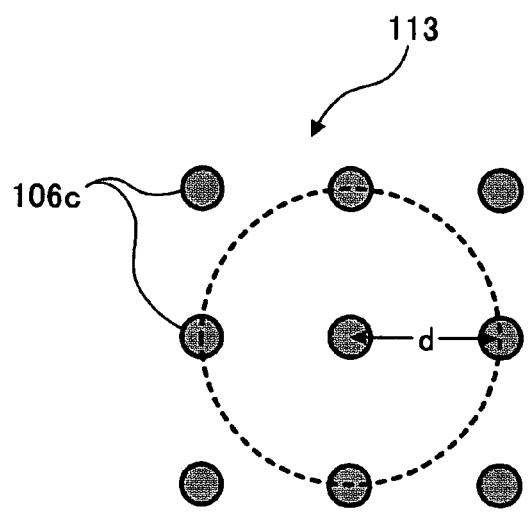
FIG. 8 is an illustration for explaining a dot distance between two adjacent dots.
Figure 9:
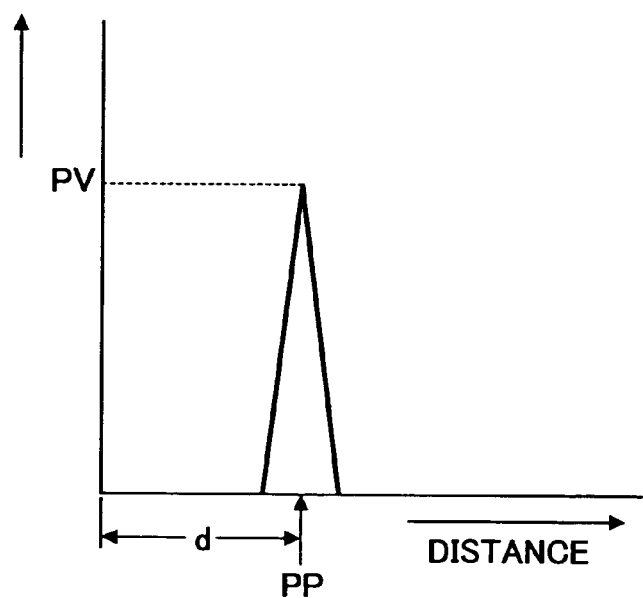
FIG. 9 is a graph representing a relationship between the dot distance and an appearance frequency of the dot distances.

FIG. 8 illustrates an arbitrary portion of the background dot pattern 113 in which any two adjacent dots 106*c* are spaced apart by a predetermined dot distance d. This predetermined dot distance d can represent a characteristic quantity of the background dot pattern 113. In the background dot pattern 113 of FIG. 8, one dot of interest (i.e., the focused dot) among the dots 106*c* is surrounded by four other dots with the same predetermined dot distance d. Using this dot distance d, the characteristic quantity of the background dot pattern can properly be detected even if the pattern is like the one shown in FIGS. 6B or 7B, for example. When a plurality of distances between the adjacent dots 106*c* are measured after the dots 106*c* are detected from the background dot pattern 113, for example, a relationship between the measured dot distances d and a frequency of appearance of each measured dot distance can be represented by the graph of FIG. 9, in which the horizontal axis is the measured dot distance d and the vertical axis is the frequency of appearance of each measured dot distance. The graph shows a reverse-V-like shape with the center representing a peak-to-peak (PP) distance (i.e., the predetermined dot distance d) and the top representing a peak value (PV) of a number of occurrences. The reason why the distribution in this graph disperses from the PP distance is that, by taking the instance of FIG. 8, the distances between the four surrounding dots and the focused dot happen to be unequal to the predetermined dot distance d.

Therefore, when the distances between the surrounding dots and the focused dot are measured, the measurement result is verified with a predetermined threshold value for the predetermined dot distance d so that the characteristic quantity with respect to the predetermined dot distance d can be determined in a more accurate manner. In this case, as is clear from FIG. 9, erroneous dot detection or omission will easily occur when the threshold value is relatively small, but it will not easily occur when the threshold value is relatively great.

Figure 10A:
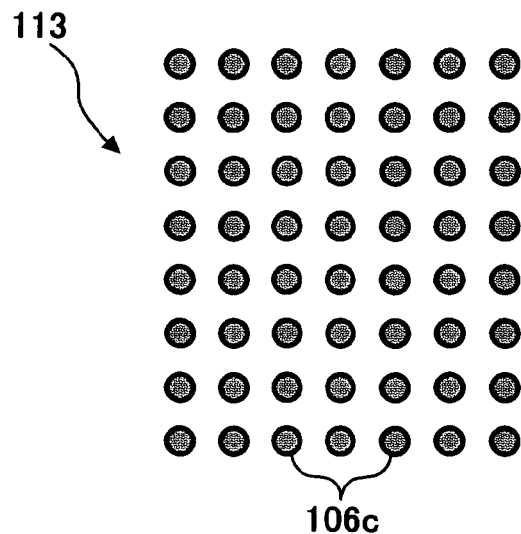
FIGS. 10A and 10B are illustrations for explaining an arrangement of dots wherein distances between any two adjacent dots are substantially equal to each other.
Figure 10B:
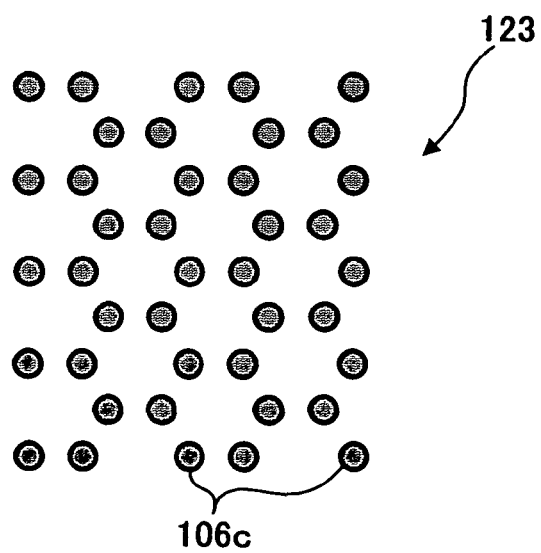

The pattern illustrated in FIG. 10A is the same background dot pattern 113 of FIG. 8, in which the distances between any two adjacent dots in the pattern are equal to each other. In this case, the characteristic quantity relates to the distances between the surrounding dots and the focused dot. FIG. 10B shows a pattern in which a background dot pattern 123 has a dot arrangement different from the FIG. 10A case, but the distances between any two adjacent dots in the background dot pattern 123 are still equal to each other. For reference sake, the dot density of the background dot pattern 113 of FIG. 10A is different from that shown in FIG. 10B.

Assuming that the predetermined dot distance d between any two adjacent dots is constant, the background dot patterns of FIGS. 10A and 10B are not distinguishable from each other by using the predetermined dot distance d as the characteristic quantity. The background dot pattern of FIG. 10A forms dots 106c in a way such that any dot 106c of interest is surrounded by four other dots 106c with an equal distance d from the dot 106c of interest. The background dot pattern of FIG. 10B forms dots 106c in a way such that any dot 106c of interest is surrounded by three other dots 106c with an equal distance from the dot 106c of interest. For these background dot patterns, the use of dot density as the characteristic quantity can allow a successful pattern detection with a high fidelity; however, the use of dot distance as the characteristic quantity does not lead to a successful pattern detection. For example, one case may be such that a detection of the background dot pattern 113 of FIG. 10A is attempted from the original image 101 which actually includes the background dot pattern 123 of FIG. 10B but not the background dot pattern 113. Another case may be such that a detection of the background dot pattern 123 of FIG. 10B is attempted from the original image 101 which actually includes the background dot pattern 113 of FIG. 10A but not the background dot pattern 123. In other words, the number of occurrences of over-detection will be increased when the background dot pattern 113 or 123 in which a constant dot distance d of adjacent dots is used as a test pattern to be detected from the original image.

Figure 11:
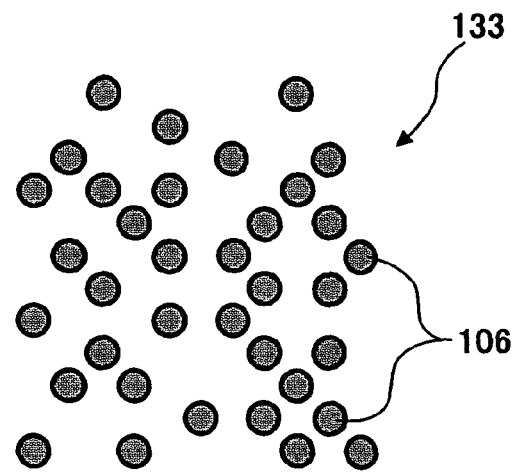
FIG. 11 is an illustration for explaining another arrangement of dots in which more than one different distances between two adjacent dots are provided.
Figure 12:
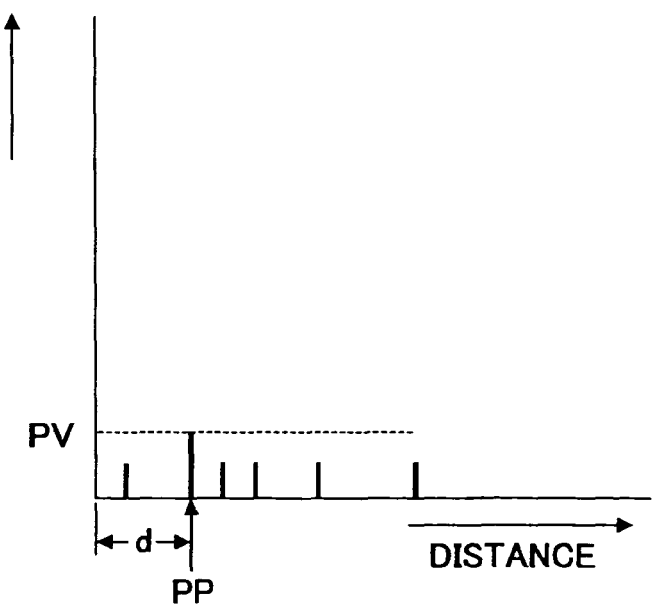
FIG. 12 is a graph representing a relationship between the dot distance and an appearance frequency of the dot distances for the FIG. 11 case.

FIG. 11 shows another background dot pattern 133 devised from the above consideration in order to be able to properly detect a background dot pattern even in the cases described above. The background dot pattern 133 is prepared based on the characteristic quantity using a plurality of different dot distances and a plurality of different appearance frequencies of the measured dot distances. The background dot pattern 133 can be represented by the graph of FIG. 12, which shows a distribution of the peak value PV with respect to the dot distances d between two adjacent dots as a characteristic quantity. With this arrangement, the background dot pattern 133 can properly be detected without occurrence of over-detection.

Figure 13:
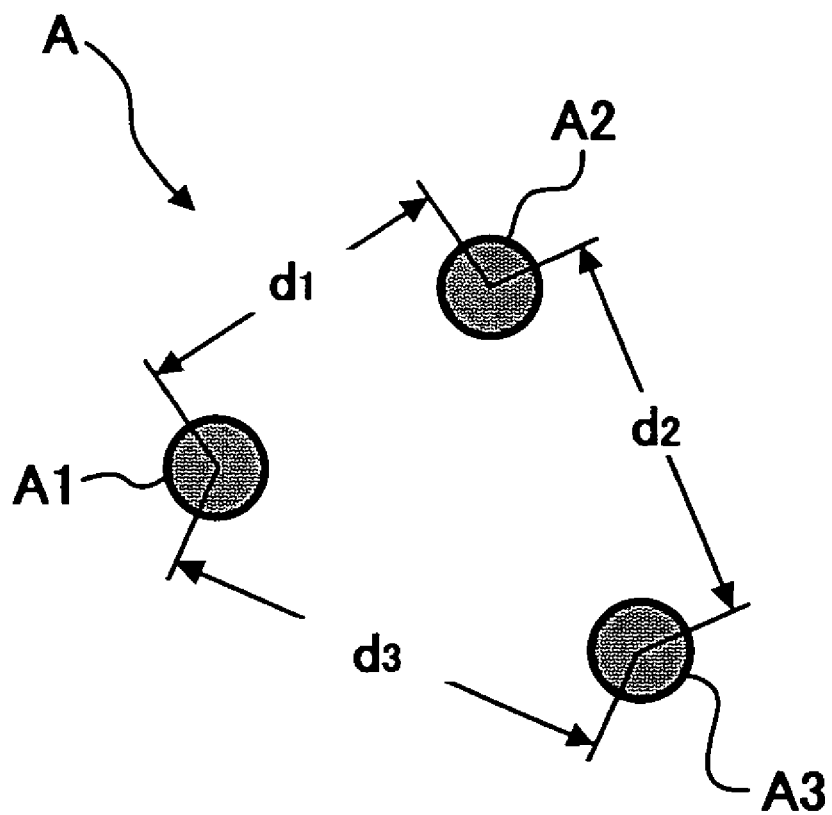
FIG. 13 is an illustration for explaining another arrangement of dots.
Figure 14A:
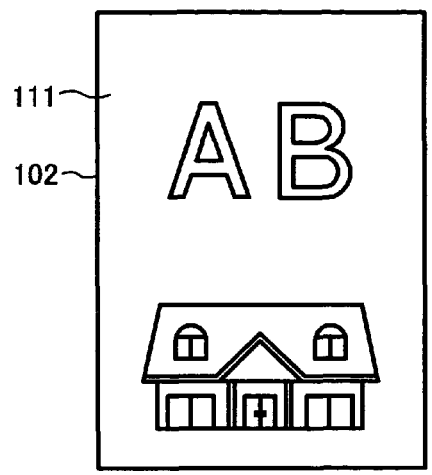
FIGS. 14A and 14B are illustrations of another image by applying the dots of FIG. 13.
Figure 14B:
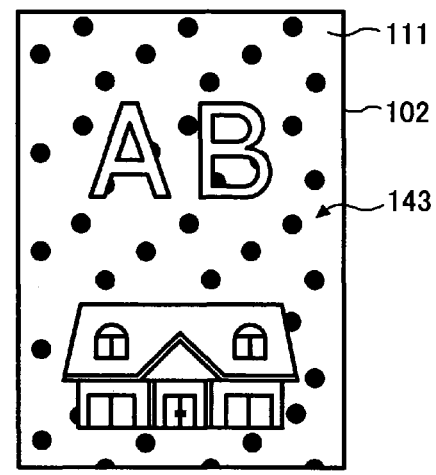

Referring to FIG. 13, another example of a characteristic quantity is explained. FIG. 13 shows a basic unit A of three dots A1, A2, and A3. In the basic unit A, the three dots A1, A2, and A3 are arranged such that a distance d1 between the dots A1 and A2, a distance d2 between the dots A2 and A3, and a distance d3 between the dots A3 and A1 are different from each other. A background dot pattern 143 (FIG. 14B) made of a number of basic units A can readily be detected with, for example, pattern matching or the like. The basic unit A and the background dot pattern 143 formed as an aggregation of the basic units A have a characteristic quantity. The background dot pattern 143 can have a characteristic quantity based on a dot density in a unit area with respect to the basic unit A, for example. FIG. 14A demonstrates a manner in which the original image 111 is printed on the original sheet 102, and FIG. 14B shows a manner in which the background dot pattern 143 is printed under the original image 111.

The background dot pattern 143 is merely one exemplary dot pattern included in image data and which representing specific characteristic information. The specific characteristic information may be an expression of lines other than dots or other forms or other characteristic than forms, associated with an image, such as colors or the like.

Figure 15:
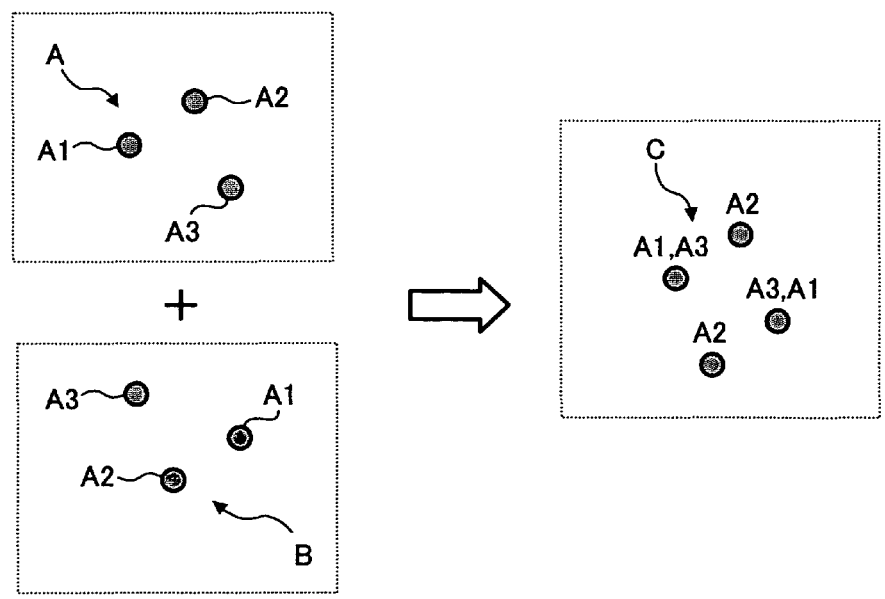
FIG. 15 is an illustration for explaining another arrangement of dots.

Referring to FIGS. 15-20C, more characteristic quantity examples are explained. FIG. 15 schematically shows a way of generating an inversed unit B and a composite unit C based on the basic unit A. As shown in FIG. 15, the inversed unit B is made by turning the basic unit A by 180 degrees and the composite unit C is made by adding the basic unit A to the inversed unit B such that the dots A1 and A3 of the basic unit A are exactly superposed on the dots A3 and A1, respectively, of the inversed unit B. An aggregation of such composite C forms a background dot pattern 143.

The above-described background dot pattern 143 including an aggregation of the composite units C which contains specific information is capable of preventing a visual identification of the basic unit A and the inversed unit B, and it thus assures a relatively high security over the specific information.

Generally, the pattern matching for identifying a specific pattern needs a dictionary, table or the like containing a number of pattern references to cover every possible variations in 360-degree angles. Use of the background dot pattern 143 made of the composite unit C, however, can reduce by half a number of pattern matching references as a dictionary to deal with various rotating variations of the composite unit C since the composite unit C is made of the basic unit A and the 180-degree-turned inversed unit B. This enables a system that uses the background dot pattern 143 implanted with the composite unit C to conduct real-time processing. Thus, such system can achieve real-time processing while improving accuracy of pattern recognition. Actually, the reference dictionary is prepared in a way such that 360 degrees is divided by a positive integer into a specific angle and the composite units C included in the background dot pattern 143 are in turn rotated by the specific angle.

As an alternative to the composite unit C, more than two basic units A may be conjoined to each other with appropriate turns. For example, three of the basic units A are conjoined at a predetermined position; a first one has no turn, a second one is turned by 120 degrees, and a third one is turned by 240 degrees.

Further, a background dot pattern made of a plurality of composite units C meets a requirement to have as many composite units C as possible in a pattern while avoiding an erroneous detection of isolated dots in the basic unit A.

Figure 16:
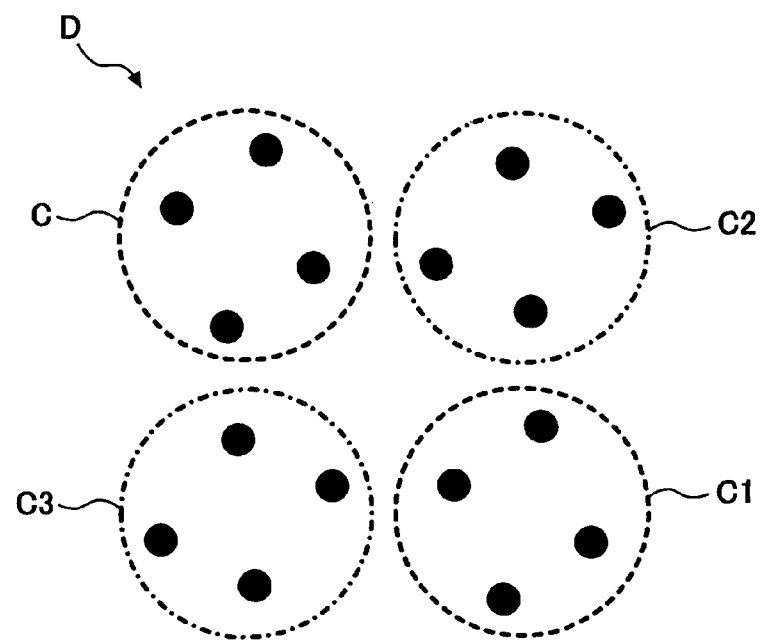
FIG. 16 is an illustration for explaining another arrangement of dots.
Figure 17A:
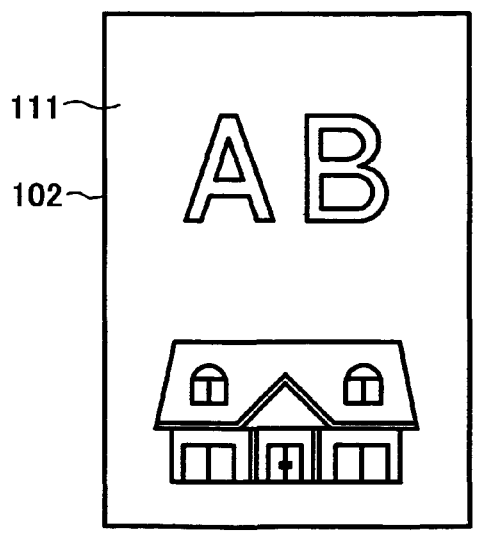
FIGS. 17A and 17B are illustrations of another image by applying the dots of FIG. 16.
Figure 17B:
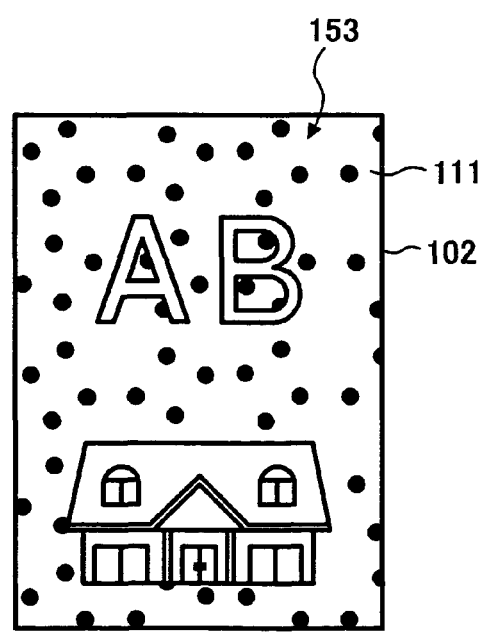

FIG. 16 illustrates a composite unit D which is a combination of the composite unit C, a composite unit C1 obtained by turning the composite unit C by 180 degrees, a composite unit C2 obtained by turning the composite unit C by x degrees, and a composite unit C3 obtained by turning the composite unit C1 by 180 degrees. FIG. 17A demonstrates a manner in which the original image 111 is printed on the original sheet 102, and FIG. 17B shows a manner in which a background dot pattern 153 made of a plurality of the composite units D is printed under the original image 111.

The above-described background dot pattern 153 including an aggregation of the composite units D which contains specific information is capable of preventing a visual identification of the composite units C, C1, C2, and C3, and it thus assures a relatively high security over the specific information.

As described above, the pattern matching for identifying a specific pattern generally needs a dictionary containing a number of pattern references to cover every possible variations in 360-degree angles. Use of the background dot pattern 153 made of the composite unit D, however, can reduce by half the number of pattern matching references in the dictionary to deal with various rotating variations of the composite unit D since the composite unit D is made of a unit of the composite units C and C2 and a 180-degree-turned inversed unit of composite units C1 and C3. This enables a system that uses the background dot pattern 153 implanted with the composite unit D to conduct real-time processing. Thus, such system can achieve real-time processing while improving accuracy of pattern recognition.

Further, it is possible to provide the composite unit D with various kinds of specific information by varying an angle expressed as "x degrees" applied to the composite unit C1 so that the specific information of the background dot pattern having the composite unit D and specific information which may be included in the original image 111 can properly be detected without an erroneous mix-up data reading therebetween. That is, the above-described background dot pattern 153 increases pattern redundancy so that possibility of an erroneous data detection caused by existence of patterns included in the original image 111 made of dots in various sizes and screens in various line numbers can be suppressed.

Figure 18:
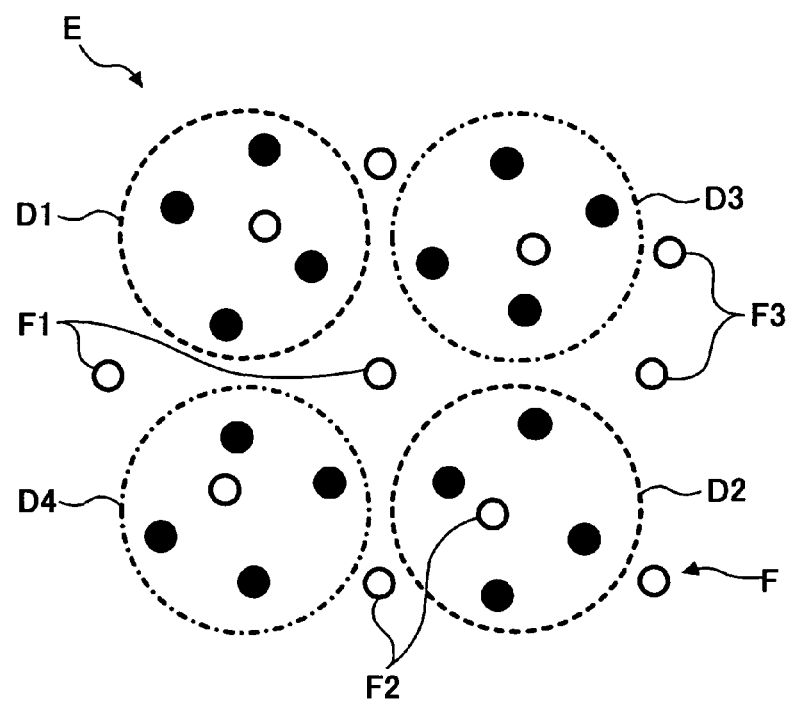
FIG. 18 is an illustration for explaining another arrangement of dots.
Figure 19A:
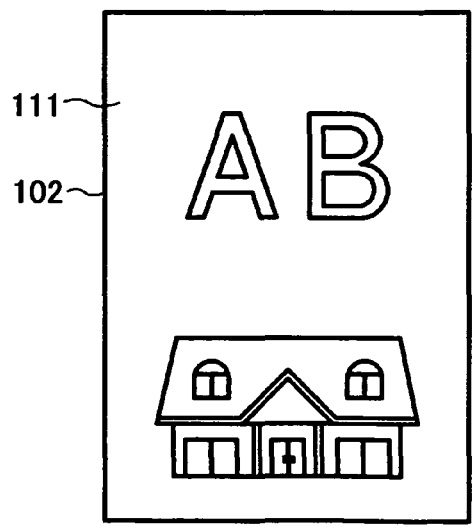
FIGS. 19A and 19B are illustrations of another image by applying the dots of FIG. 18.
Figure 19B:
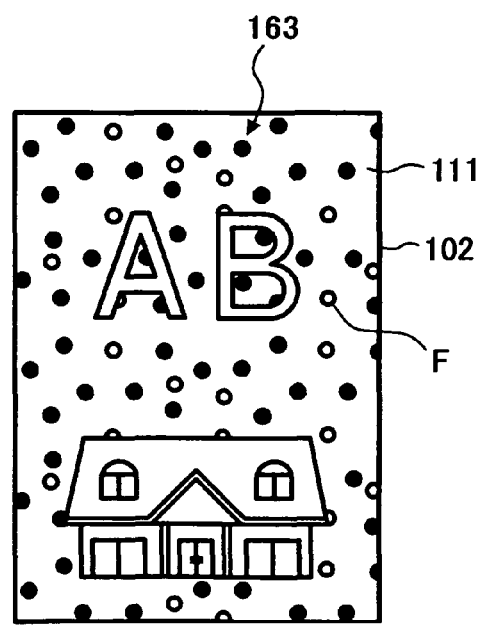

FIG. 18 illustrates a composite unit E, which is a combination of composite units D1, D2, D3, D4, and dummy dots F. The composite unit D1 includes the composite D and a dummy dot F, and the composite unit D2 is obtained by turning the composite unit D1 by 180 degrees. The composite unit D3 is obtained by turning the composite unit D1 by x degrees, and the composite unit D4 is obtained by turning the composite unit D2 by 180 degrees. A plurality of dummy dots F are also arranged outside the composite units D1-D4, as illustrated in FIG. 18. Sets of two dots out of the plurality of dummy dots F form various kinds of dummy patterns F1, F2, and F3, for example, as illustrated in FIG. 18. FIG. 19A demonstrates a manner in which the original image 111 is printed on the original sheet 102, and FIG. 19B shows a manner in which a background dot pattern 163 made of an aggregation of the composite units E is printed under the original image 111. In the drawing, each dummy dot F is indicated as a white dot for the sake of convenience.

With the above-mentioned arrangement, the original image 111 increases evenness of its dot density and improves its readability. Furthermore, the addition of the dummy patterns to the background dot pattern can prevent an obstructive effect caused by existence of the background dot pattern.

Figure 20A:
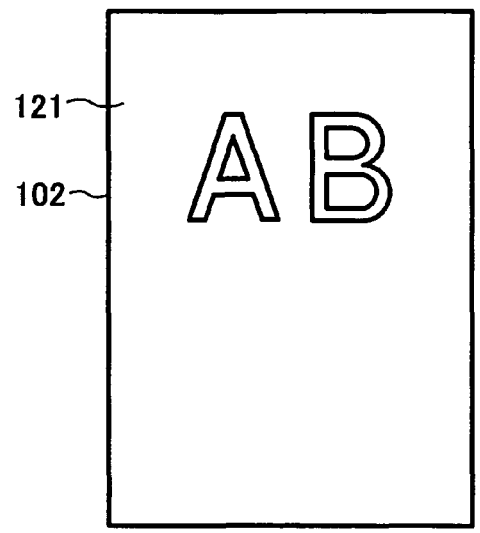
FIGS. 20A-20C are illustrations of another image by applying another dot arrangement.
Figure 20B:
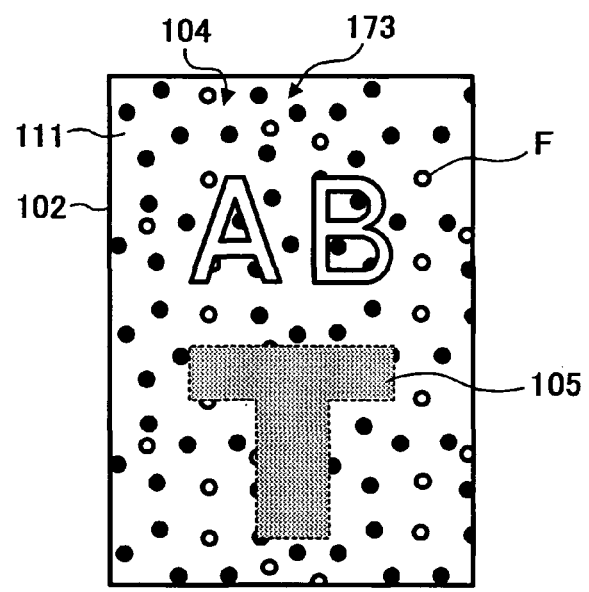
Figure 20C:
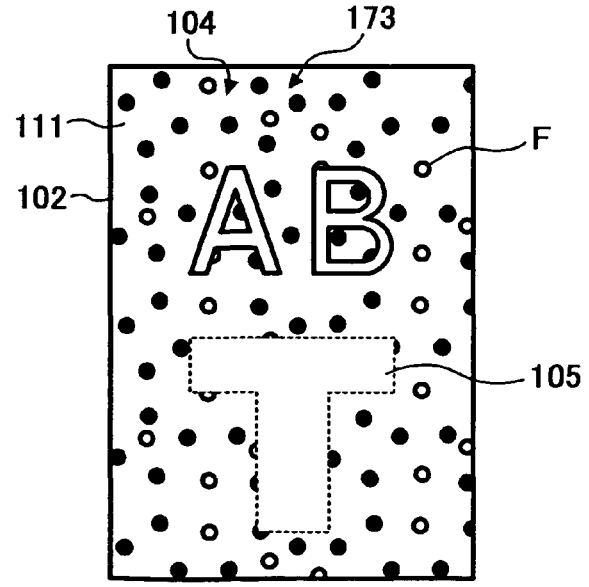

Referring to FIGS. 20A-20B, additional image examples prepared for the background copy arrangement according to the present invention are explained. As shown in FIG. 20A, an original image 121 having letters "AB" is on the original sheet 102. FIG. 20B shows an image in which the original image 121 superposes over a background dot pattern 173 which is based on the background dot pattern 163 and includes an image of "T" serving as an image of the message area 105 which superposes over the background dot pattern 163 serving as an image of the base area 104. The "T" image which is located at a position underneath the letters "A" of the original image 121 is made of relatively smaller dots such as the dots 106b (see e.g., FIG. 4B) so that the image of "T" will disappear when it is copied, due to the effect of the above-described background copy arrangement, as illustrated in FIG. 20C.

In this way, when the disappearing image (e.g., the letter "T") is implanted in the message area 105 and the background dot pattern 163 is used in the base area 104, the disappearing image is caused to appear as a distinct image while the composite units D1-D4 and F which form the background dot pattern 173 are kept difficult to be identified through a visual observation.

Figure 21:
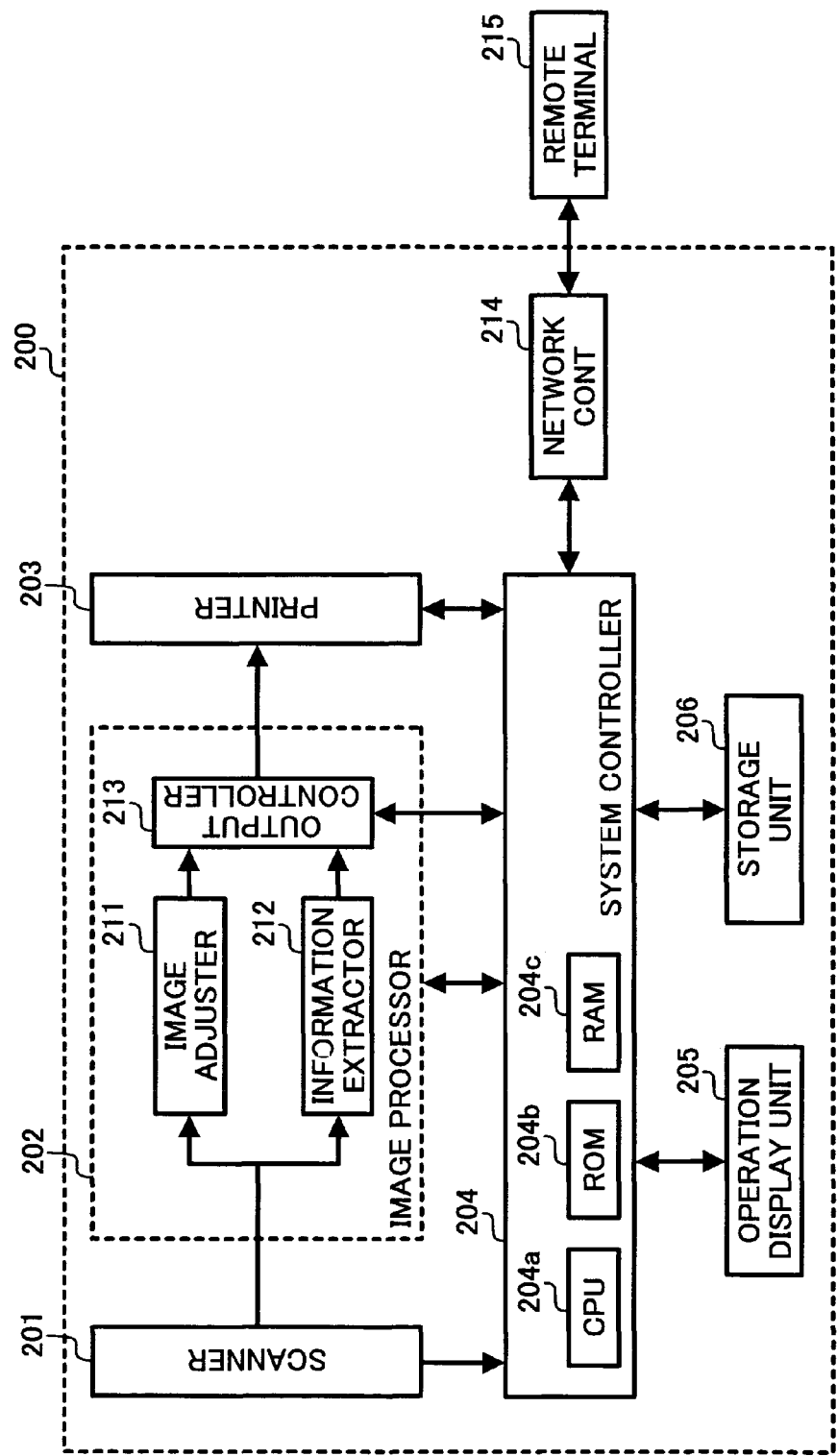
FIG. 21 is a schematic block diagram of an image processing apparatus according to an exemplary embodiment of the present invention.

Next, an image processing apparatus 200 as one example of an embodiment according to the present invention is explained with reference to FIG. 21. FIG. 21 shows the image processing apparatus 200 which is configured to detect the above-described background pattern so as to perform a copy protection operation of the invention. As shown in FIG. 21, the image processing apparatus 200 includes a scanner 201, an image processor 202, a printer 203, a system controller 204, an operation display unit or panel 205, a storage unit 206 (e.g., a hard disc drive), and a network controller 214. The system controller 204 forms a part of a computer which is a general personal computer, and includes a CPU (central processing unit) 204a, a ROM (read only memory) 204b, and a RAM (random access memory) 204c. By using computing functions achieved with these components, the system controller 204 controls the entire operations of the scanner 201, the image processor 202, and the printer 203 according to the instructions input through the operation display unit 205, displays information on the operation display unit 205, and stores the information into the hard disc drive 213 on an as needed basis. The image processing apparatus 100 is connected to a remote terminal 215 (e.g., a personal computer) via the network controller 214 to communicate with each other. As shown in FIG. 21, the image processor 202 of the image processing apparatus 200 includes an image adjuster 211, an information extractor 212, and an output controller 213.

Figure 22:
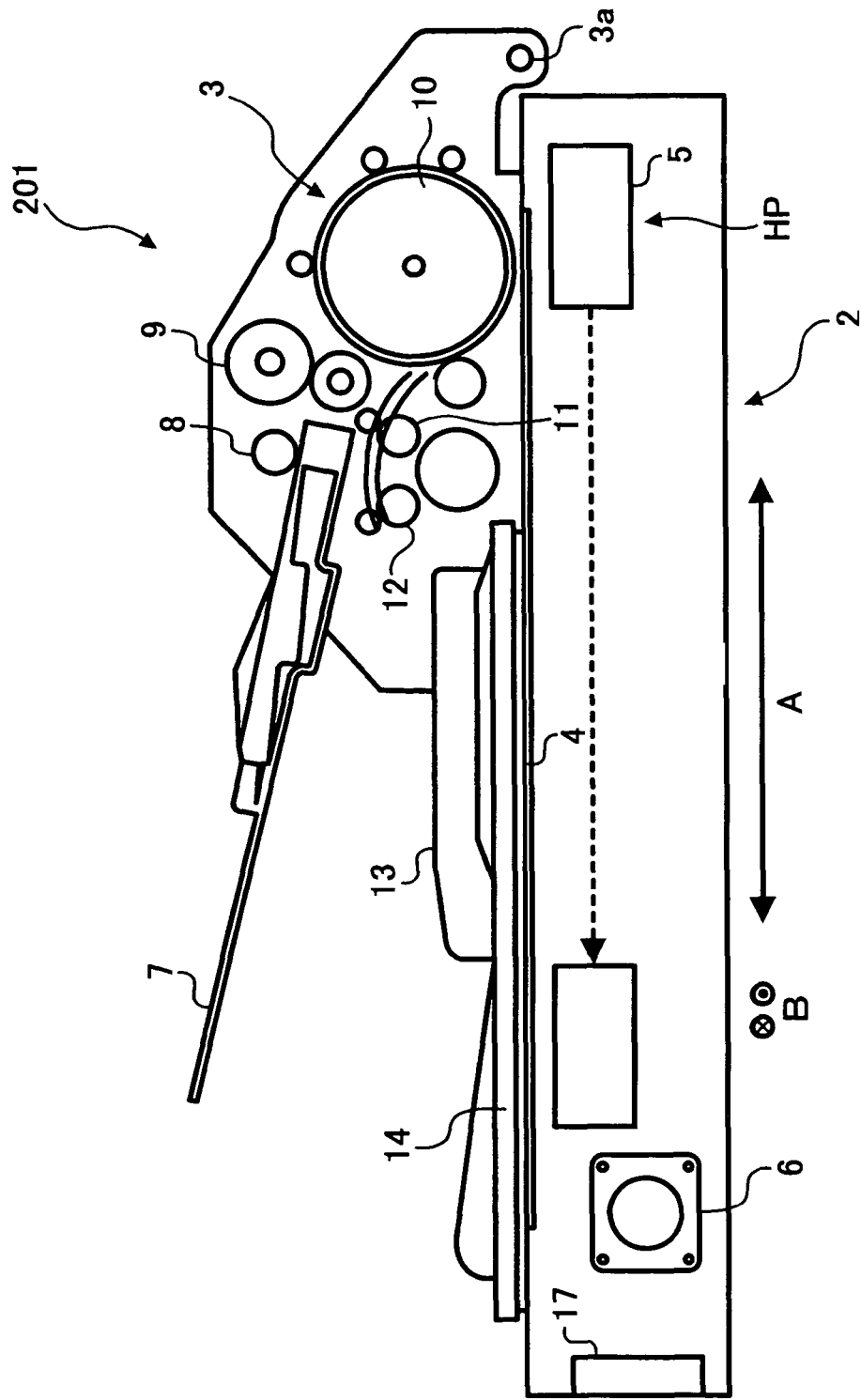
FIG. 22 is a schematic diagram of a scanner included in the image processing apparatus of FIG. 21.

Referring to FIG. 22, the scanner 201 is now explained in more detail. FIG. 22 shows the scanner 201 as including a main body 2 and an ADF (automatic document feeder) 3. The main body 2 includes a contact glass 4, an optical scanning unit 5, a drive motor 6, an ejection tray 13, and a platen cover 14. The ADF 3 includes an original tray 7, a pick-up roller 8, a pair of registration rollers 9, a transfer drum 10, a pair of transfer rollers 11, and a pair of ejection rollers 12. The ADF 3 is mounted on the main body 2 with a support shaft 3a such that the ADF 3 is movable about the support shaft 3a to selectively operate in a sheet-scan mode (also referred to as an ADF mode) and a book-scan mode. The contact glass 4 on which an original (e.g., the contract sheet 100) is disposed at a position on the main body 2 underneath the platen cover 14 and facing the optical scanning unit 5 disposed inside the main body 2. The optical scanning unit 5 is generally referred to as a close-contact image sensor and includes a light source (not shown) and a line sensor (not shown) which includes a plurality of charge coupled devices which are arranged in line to cover a width of an original (e.g., the contract sheet 100). In FIG. 22, direction A is referred to as a sub-scanning direction in which the optical scanning unit 5 is moved in the book-scan mode or the original is moved in the sheet-scan mode. Direction B is referred to as a main scanning direction in which the plurality of the charge coupled devices are arranged in line.

The optical scanning unit 5 is driven by the drive motor 6 (e.g., a stepping motor) via pulleys and wires so as to move in the sub-scanning direction A.

The optical scanning unit 5 is usually located at a home position HP and is moved in a direction towards the drive motor 6, as indicated by a dotted line with an arrow. During the movement in the direction towards the drive motor 6, the optical scanning unit 5 scans and reads the original image 101, for example, placed on the contact glass 4 by irradiating the original image 101, for example, with light from the light source and receiving the reflected light from the original image 101 with the plurality of charge coupled devices. This operation is in the book-scan mode.

In the sheet-scan mode, the optical scanning unit 5 is held at the home position HP while scanning and reading the original image 101 which is moved instead in the sub-scanning direction A over the plurality of charge coupled devices with the pick-up roller 8, the pair of registration rollers 9, the transfer drum 10, the pair of transfer rollers 11, and the pair of ejection rollers 12. After the scanning and reading by the optical scanning unit 5, the original is ejected to the ejection tray 13 by the pair of ejection rollers 12. The ejection tray 13 is disposed on the platen cover 14, and the platen cover 14 is movably held on the main body 2 so as to make a wide access area relative to the contact glass 4 when it is moved into an open position. The ADF 3 further includes a drive motor (not shown) which drives the pick-up roller 8, the pair of registration rollers 9, the transfer drum 10, the pair of transfer rollers 11, and the pair of ejection rollers 12 via a series of gears (not shown).

Figure 23:
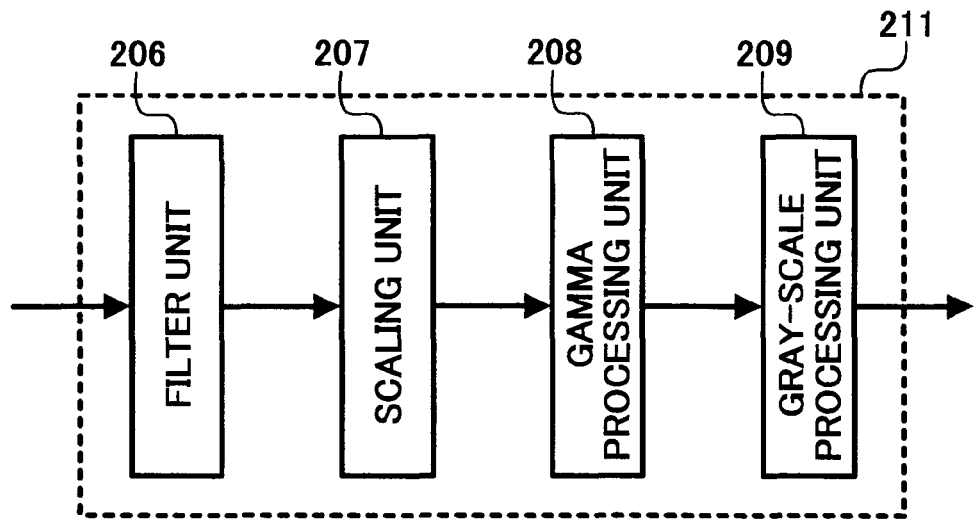
FIG. 23 is a schematic block diagram of an image adjuster included in the image processing apparatus of FIG. 21.

Referring to FIG. 23, an exemplary structure of the image adjuster 211 is now explained. As shown in FIG. 23, the image adjuster 211 includes a filter unit 206, a scaling unit 207, a gamma processing unit 208, and a gray-scale processing unit 209. These components are substantially equivalent to and have no substantial differences from those circuits employed in a general digital copying machine and therefore a description for these components are omitted. The image adjuster 211 having these components can be structured by digital circuits, processors such as an SIMD (single instruction and multi data) or the like, and so forth.

The output controller 213 (FIG. 21) determines whether to output the image data of the original image 101 read by the scanner 201 to the printer 203 in accordance with a result of determination performed by the information extractor 212, explained below.

Figure 24:
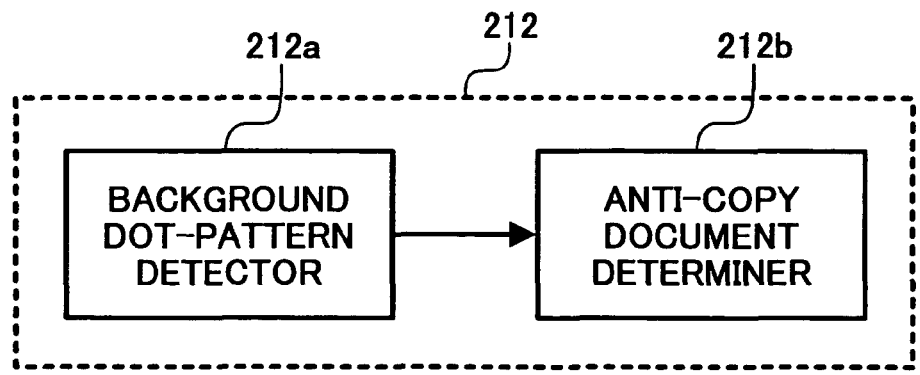
FIG. 24 is a schematic diagram of an information extractor included in the image processing apparatus of FIG. 21.

The information extractor 212 includes, as shown in FIG. 24, a background dot pattern detector 212a and an anti-copy document determiner 212b. These are hardware components including digital circuits for detecting an anti-copy document such as the contract sheet 100, for example, and prohibiting a reproduction of such anti-copy document when it is detected. The information extractor 212 may be structured by a processor such as an SIDM (single instruction and multi data) or the like.

The background dot detector 212a is configured to detect an anti-copy document in a unit of a basic dot pattern such as the above-described composite unit A, C, D, or E. More specifically, the background dot detector 212a detects a predetermined basic dot pattern such as the composite unit A, for example, which is included in the dot pattern for the anti-copy document implanted in the image data read from the original image 101 by the scanner 201. An actual method of the detection is selected from among various known techniques for detecting image patterns with digital circuits, such as a pattern matching technique, for example. After the detection of the predetermined basic dot pattern, the background dot detector 212a compares the detected predetermined basic dot pattern to a reference anti-copy dot pattern prestored in a memory (not shown), and performs an identification check for determining whether the detected predetermined basic dot pattern is identical to the reference anti-copy dot pattern. The background dot detector 212a performs the above-mentioned identification check for a plurality of basic dot pattern units included in the background dot pattern of the image data under examination, and transmits results of the identification check to the anti-copy document determiner 212b.

The anti-copy document determiner 212b receives the results of the identification check and determines whether the image data under examination is an anti-copy document based on the results of the identification check sent from the background dot pattern detector 212a. When determining that the image data read from the original image 101 is an anti-copy document, the anti-copy document determiner 212b transmits to the system controller 204 a signal indicating that an anti-copy document is detected.

Upon detecting such signal from the anti-copy document determiner 212b, the system controller 204 prohibits reproduction of the image data under process by the printer 203. Thereby, the image forming apparatus 200 can prohibit reproduction of the image data thus determined as an anti-copy document.

The above-described copy prohibition is one exemplary way of prohibiting an output of a copy-prohibited document. As an alternative, particularly in a system in which a scanned document, even a copy-prohibited document, can easily be distributed through e-mail, facsimile transmission, data transmission, etc., the copy prohibition can be achieved by banning a distribution of the original image 101, for example, scanned by the scanner 201 when a document is determined as a copy-prohibited document in the way as described above.

As another alternative, the system controller 204 may change values of pixels included in the image determined as an anti-copy document to a predetermined pixel value so that the image is filled in with a specific color (e.g., a white, gray, or black color) determined by the predetermined pixel value. As an alternative, the system controller 204 may add a repetitive pattern signal to the image to make the image illegible.

Further, as another alternative, the system controller 204 may notify an event that the image data determined as an anti-copy document is read and reproduced, to the remote terminal 215 through the network controller 214. The remote terminal 215 may be a computer of an administrator, for example, such as a personal computer, a mobile computer, a cellular phone, etc.

On the other hand, when the image data of the original image 101 read by the scanner 201 is determined to be a regular document and not an anti-copy document, the system controller 204 conducts a regular operation for allowing the printer 203 to reproduce the image data.

As an alternative to the above-described hardware structure using the digital circuits or the SIMDs, it is possible to install a program in a memory such as the ROM 204b, the RAM 204c, or the storage unit 206 so that the system controller 204 can conduct the anti-copy detection and prohibition operation along with the instructions of the program.

Figure 25A:
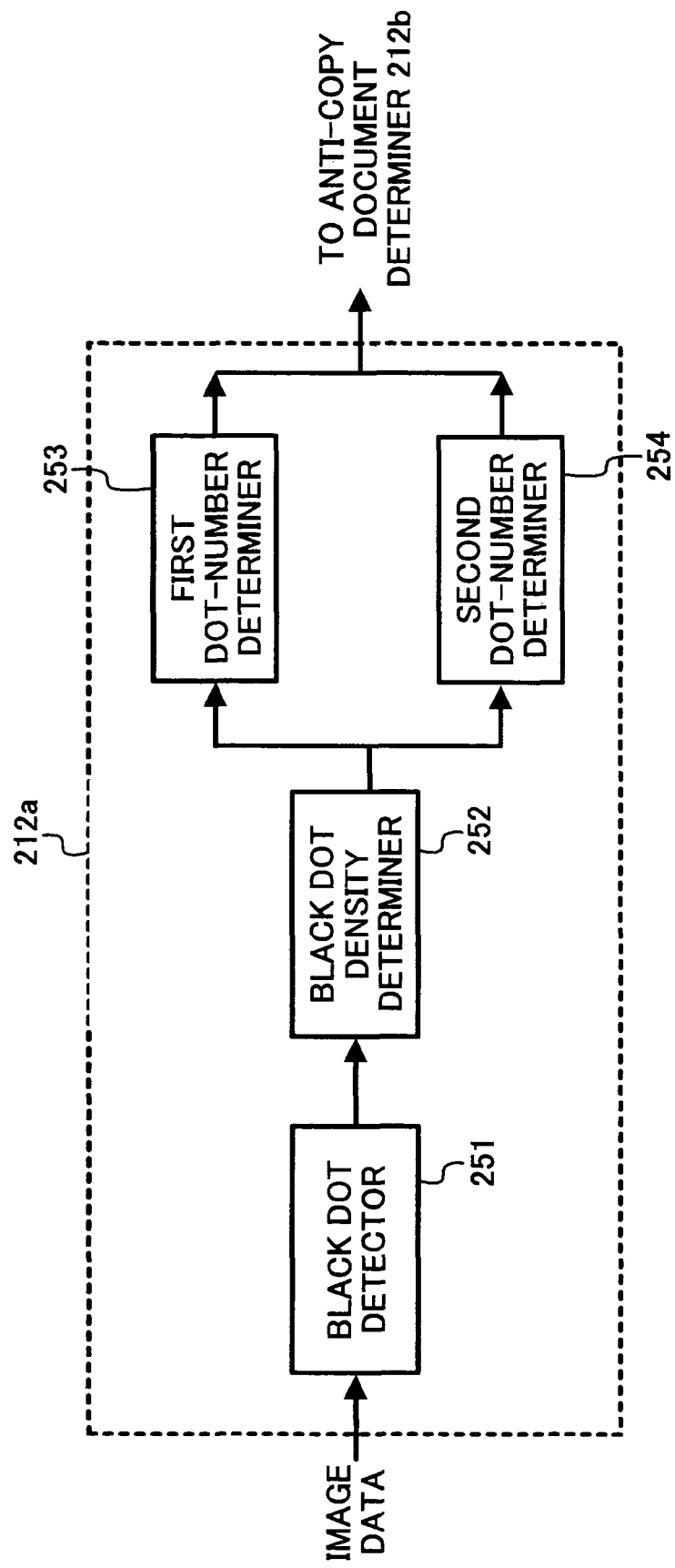
FIGS. 25A and 25B are schematic block diagrams of background dot pattern detector included in the image processing apparatus of FIG. 21.
Figure 25B:
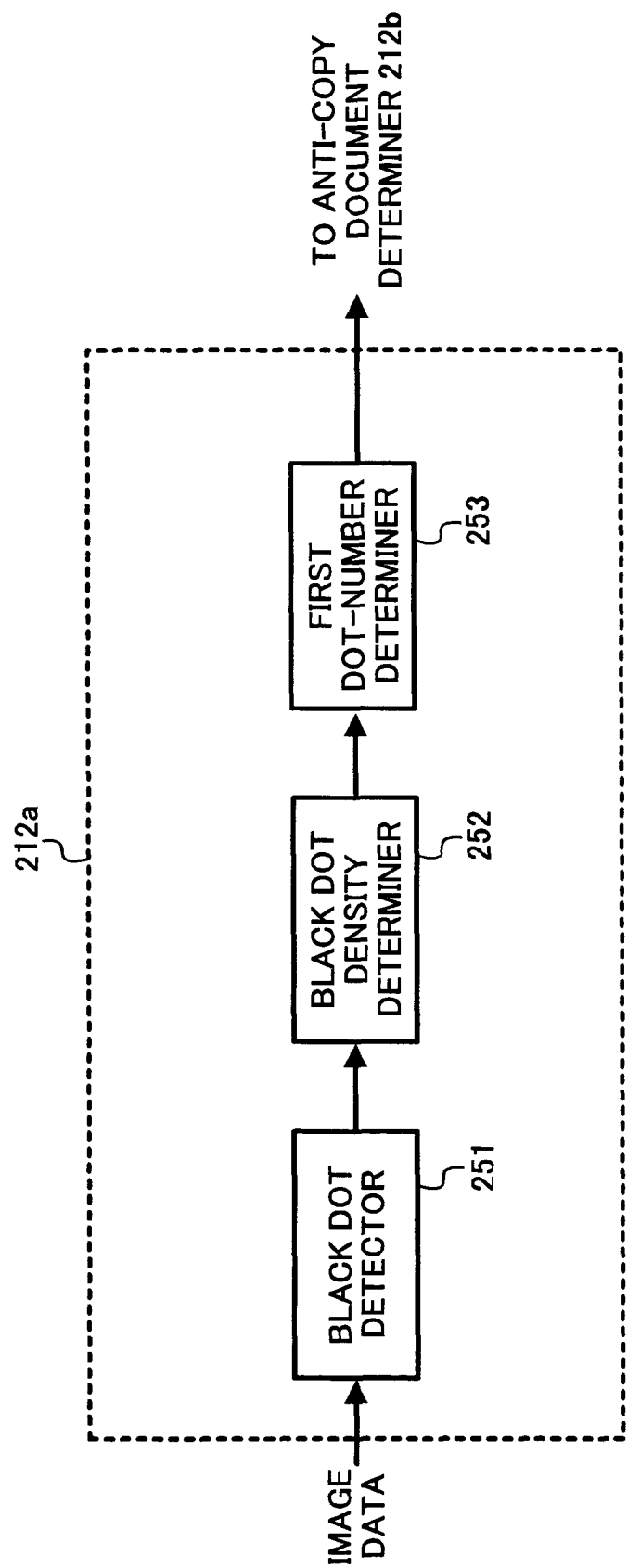

Referring to FIGS. 25A and 25B, exemplary structures of the background dot pattern detector are explained in details. FIG. 25A shows an exemplary structure of the background dot pattern detector 212a, and FIG. 25B shows an exemplary alternative to it. As shown in FIG. 25A, the background dot pattern detector 212a includes a black dot detector 251, a black dot density determiner 252, a first dot-number determiner 253, and a second dot-number determiner 254. The black dot detector 251 detects the dots 106 from the image data generated based on the readings of the original image 101 by the scanner 201. An actual method of the detection is selected from among various known techniques for detecting image patterns with digital circuits, such as a pattern matching technique, for example. After the detection of the dots 106, the black dot density determiner 252 calculates a dot density within a specific area with respect to the dots 106 detected by the black dot detector 251. This calculation can be performed using digital counters, adders, and so on.

In the background dot pattern detector 212a, each of the first dot-number determiner 253 and the second dot-number determiner 254 includes a memory area (not shown). The first dot-number determiner 253 stores a first base area threshold value to be used as a permissible value in the identification determination relative to a dot density detected in a specific unit area of the base area 104 in the background dot pattern 103. Based on this first base area threshold value, the black dot density determiner 252 performs the dot density calculation. The first dot-number determiner 253 also stores a second base area threshold value to be used as a permissible value in the identification determination relative to a dot number detected in a specific unit area of the base area 104 in the background dot pattern 103.

The second dot-number determiner 254 stores a first message area threshold value to be used as a permissible value in the identification determination relative to a dot density detected in a specific unit area of the message area 105 in the background dot pattern 103. Based on this first message area threshold value, the black dot density determiner 252 performs the dot density calculation. The second dot-number determiner 254 also stores a second message area threshold value to be used as a permissible value in the identification determination relative to a dot number in a specific unit area of the message area 105 detected in the background dot pattern 103.

The first dot-number determiner 253 accumulates the number of dots 106 in a counter (not shown), for example, which are determined as the identical size, i.e., the dots 106a or the dots 106b, by the black dot detector 251, when determining that the density of dots 106 calculated by the black dot density determiner 252 is smaller than the first base area threshold value with respect to the dot density stored in the memory. The first dot-number determiner 253 then determines that the base area 104 of the background dot pattern 103 exists when the accumulated dot number is checked out as smaller than the second base area threshold value with respect to the dot number stored in the memory. The first dot-number determiner 253 transmits the determination result to the anti-copy document determiner 212b.

The second dot-number determiner 254 accumulates the number of dots 106 in a counter (not shown), for example, which is determined as the identical size, i.e., the dots 106a or the dots 106b, by the black dot detector 251, when determining that the density of dots 106 calculated by the black dot density determiner 252 is smaller than the first message area threshold value with respect to the dot density stored in the memory. The second dot-number determiner 254 then determines that the message area 105 of the background dot pattern 103 exists when the accumulated dot number is checked out as smaller than the second message area threshold value with respect to the dot number stored in the memory. The second dot-number determiner 254 transmits the determination result to the anti-copy document determiner 212b.

Upon receiving the determination result from the background dot pattern detector 212a, the anti-copy document determiner 212b performs the determination process for determining whether the present document is an anti-copy document with reference to a predefined standard. This standard can be, for example, established by being input as parameters through the operation display unit 205 and is stored in a memory area (not shown) of the anti-copy document determiner 212b. For example, the anti-copy document determiner 212b determines that the present document is an anti-copy document like a confidential document when determining that one of the base area 104 and the message area 105 of the background dot pattern 103 exists in the original image 101 read by the scanner 201. For another example, the anti-copy document determiner 212b determines that the present document is an anti-copy document like a confidential document when determining that both of the base area 104 and the message area 105 of the background dot pattern 103 exist in the original image 101 read by the scanner 201.

When the anti-copy document determiner 212b is set to the condition for determining that the present document is an anti-copy document when one of the base area 104 and the message area 105 of the background dot pattern 103 is determined as existing in the original image 101, there is no need to provide both of the first dot-number determiner 253 and the second dot-number determiner 254 in the background dot pattern detector 212a. When the base area 104 is used and the message area 105 is not used for the anti-copy document determining condition, it is necessary that the background dot pattern detector 212a includes the first dot-number determiner 253 but not the second dot-number determiner 254, as shown in FIG. 25B.

Thus, the present embodiment detects from the image data the background dot pattern 103 embedded in the background image which is included in the image data of the original image 101. Then, the present embodiment compares the detected background dot pattern 103 to the prestored reference anti-copy document pattern, thereby performing the identification determination with respect to the anti-copy document. With this operation, the present embodiment can determine whether it is permissible to output the image data of the original image 101, regardless of the types of the original image.

When the anti-copy document determiner 212b determines that the original image 101 read by the scanner 201 is an anti-copy document, it transmits information indicating that an anti-copy document is detected to the output controller 213. In response to the information, the output controller 213 performs a data scrambling operation for changing an image of the detected anti-copy document by painting the image of the detected anti-copy document with colors such as gray, white, etc., or adding letters of "DON'T COPY," for example.

When the original image 101 read by the scanner 201 is determined not to be an anti-copy document, the image processing apparatus 200 performs an ordinary reproduction operation. More specifically, the image data of the original image 101 read by the scanner 201 is processed through the image processor 202 and the resultant image data are reproduced into an image by the printer 203.

Figure 26:
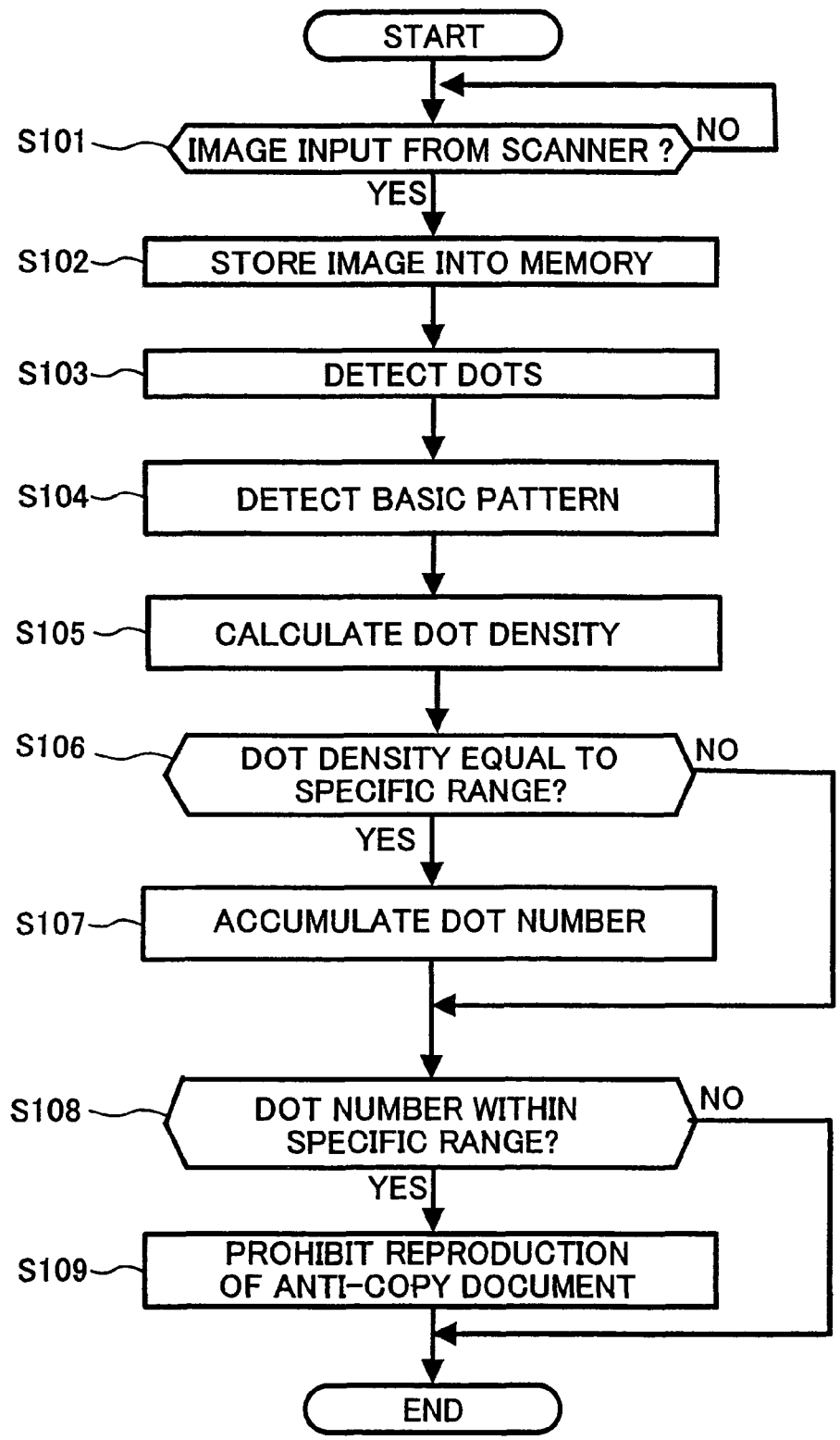
FIG. 26 is a flowchart for explaining an exemplary procedure of an anti-copy detection and prohibition operation performed by the image processing apparatus of FIG. 21.

Referring to FIG. 26, an exemplary procedure of the anti-copy document detection and prohibition operation according to an exemplary embodiment of the present invention is explained. In Step S101, the CPU 204a of the system controller 204 repeatedly checks whether image data read from the original image 101 by the scanner 201 is input to the image processor 202. This check operation is repeatedly performed at predetermined time intervals until the CPU 204a determines that image data is input. When the CPU 204a determines that image data is input and the check result of Step S101 becomes YES, the CPU 204a stores the input image data into an image memory area included in the RAM 204c in Step S102. Then, in Step S103, the CPU 204a detects the dots 106 from the input image data stored in the image memory of the RAM 204c. An actual detection method may be one of various conventional methods for detecting images such as a pattern matching method. Then, in Step S104, the CPU 204a uses its calculation functions to determine whether the detected dots 106 includes a predetermined basic dot pattern such as the basic unit A, for example, by comparing a reference basic dot pattern stored in one of the ROM 204b, the RAM 204c, and the storage unit 206 with the detected dots 106 through a known method such as pattern matching.

Then, in Step S105, the CPU 204a calculates a dot density in a unit area with respect to the predetermined basic dot pattern detected by Step S104. In this calculation of the dot density, the CPU 204a calculates a number of the predetermined basic dot patterns detected by Step S104.

In Step S106, the CPU 204a determines whether the dot density calculated in Step S105 is equal to a reference dot density stored in one of the ROM 204b, the RAM 204c, and the storage unit 206. When the dot density calculated in Step S105 is determined to be equal to the reference dot density stored in one of the ROM 204b, the RAM 204c, and the storage unit 206, the CPU 204a proceeds to Step S107 to accumulate in the RAM 204c, for example, a number of dot patterns of which dot densities are determined to be equal to the reference dot density in Step S106. Then, the CPU 204a proceeds to Step S108.

When in step 106, the dot density calculated in Step S105 is determined to be not equal to the reference dot density stored in one of the ROM 204b, the RAM 204c, and the storage unit 206, the CPU 204a jumps to Step S108. In Step S108, the CPU 204a determines whether the number of dot patterns accumulated in the RAM 204c is within a predetermined threshold value range. When the number of dot patterns accumulated in the RAM 204c is determined to be within the predetermined threshold value range and the determination result of Step S108 is YES, the CPU 204a conducts the copy prohibition operation to prohibit a reproduction of the image data, in Step S109. When the number of dot patterns accumulated in the RAM 204c is determined to be not within the predetermined threshold value range and the determination result of Step S108 is NO, the CPU 204a ends the FIG. 26 operation.

In this way, the image processing apparatus 200 can determine whether the reproduction of the image data read from the original image 101 is prohibited, regardless of types of original image, by conducting the identification check of the characteristic quantity of the detected basic dot pattern with the prestored reference basic dot pattern.

Figure 27:
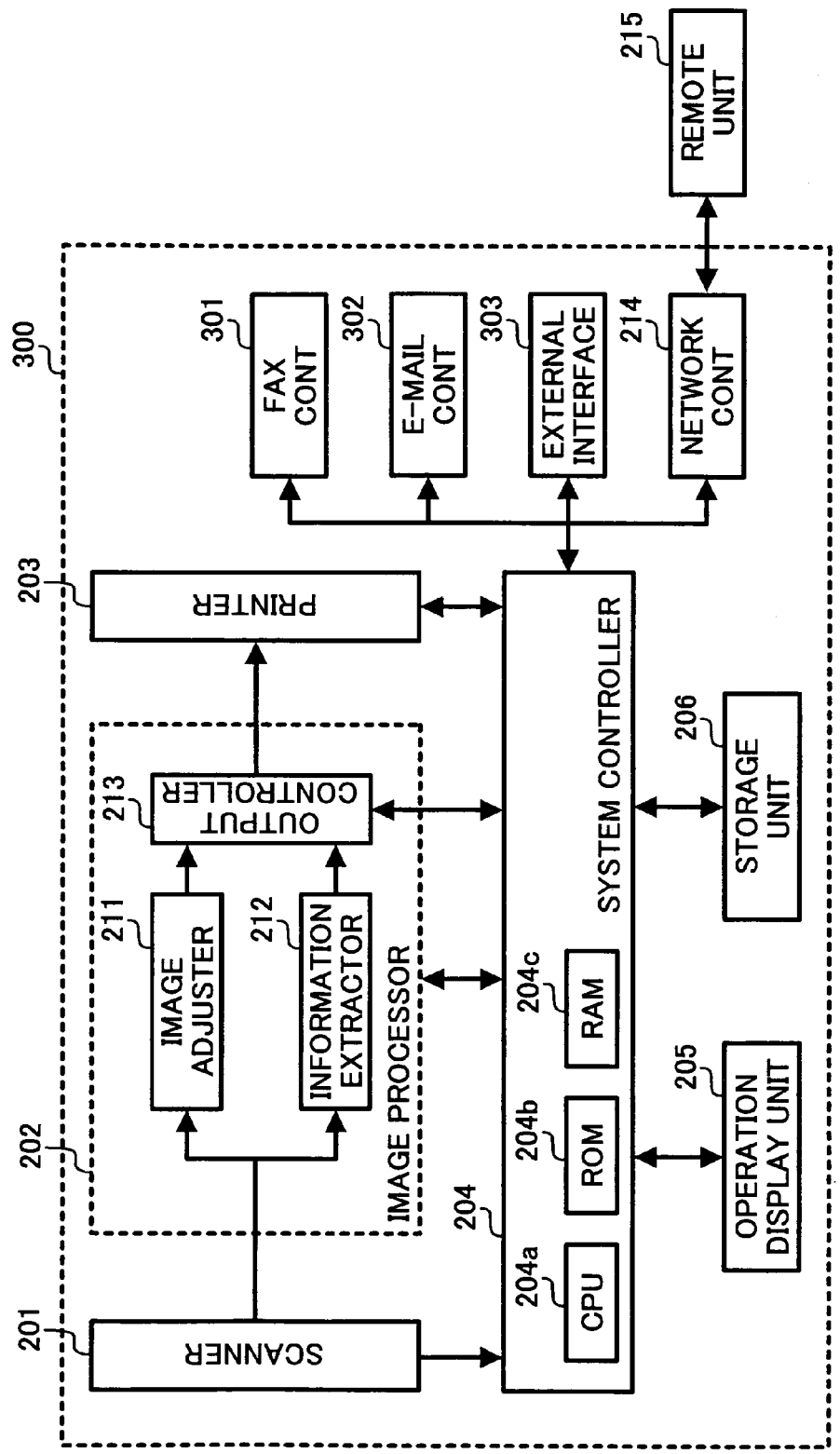
FIG. 27 is a schematic block diagram of another image processing apparatus according to an exemplary embodiment of the present invention.

Next, an image processing apparatus 300 according to an exemplary embodiment of the present invention is explained with reference to FIG. 27. FIG. 27 shows an image processing apparatus 300, which is similar to the image processing apparatus 200 except for a fax controller 301, an electric mail controller 302, and an external interface 303. The image processing apparatus 300 of FIG. 27 is a multi-function machine capable of copying, faxing, printing, scanning, e-mailing of input images, image file transferring, image data saving and transmitting, etc. In e-mailing, input image data read from original image 101 by the scanner 201, or an image obtained through the print function or the facsimile function, can be attached to and transmitted with e-mail through the e-mail controller 302. In image filing transferring, an input image file can be transferred to a personal computer connected via a network. The fax controller 301 controls a facsimile communications operation. The e-mail controller 302 controls e-mail transmission and receiving operations. The external interface 303 controls connections to various USB (universal serial bus), IEEE (Institute of Electrical and Electronics Engineers) 1394, SCSI (small computer systems interface), etc. devices.

As described above, in the image processor 202 of FIG. 27, when the anti-copy document determiner 212b of the information extractor 212 transmits information indicating that an anti-copy document is detected to the output controller 213, the output controller 213 performs a data scrambling operation for changing an image of the detected anti-copy document by covering the image of the detected anti-copy document with colors such as gray, white, etc., or adding letters of "DON'T COPY," for example. In this situation, when in a reproduction mode by the printer 203, the output controller 213 sends the image data that underwent the data scrambling operation to the printer 203 and the printer 203 prints an image covered with colors such as gray, white, etc., or adding letters of "DON'T COPY," for example. With this arrangement, the image processing apparatus 300 can protect the reproduction of the image data read by the scanner from the original image 101 when the original image 101 is determined to be an anti-copy document. When the original image 101 is determined as an ordinary document and not an anti-copy document, the image data is allowed to be reproduced by the printer 203.

As an alternative, the output controller 213 may notify the system controller 204 of the determination result when the original document 101 is determined to be an anti-copy document so that the system controller 204 controls an operation for prohibiting reproduction of the image data by the printer 203. With this arrangement, the image processing apparatus 300 can protect the reproduction of the image data read by the scanner from the original image 101 when the original image 101 is determined to be an anti-copy document.

In a network transmission mode, the output controller 213 sends the image data that underwent the data scrambling operation to the system controller 204 and the system controller 204 sends the image data covered with colors such as gray, white, etc., or adding letters of "DON'T COPY," for example, to the network via the network controller 214. With this arrangement, the image processing apparatus 300 can protect an output of the image data read by the scanner from the original image 101 when the original image 101 is determined to be an anti-copy document. When the original image 101 is determined to be an ordinary document and not an anti-copy document, the image data is allowed to be output to the network via the network controller 214.

As an alternative, the output controller 213 may notify the system controller 204 of the determination result when the original document 101 is determined to be an anti-copy document so that the system controller 204 controls an operation for prohibiting the output of the image data to the network. With this arrangement, the image processing apparatus 300 can protect the output of the image data read by the scanner from the original image 101 to the network when the original image 101 is determined to be an anti-copy document.

In a facsimile transmission mode, the output controller 213 sends the image data that underwent the data scrambling operation to the system controller 204 and the system controller 204 instructs the fax controller 301 to transmit the image data covered with colors such as gray, white, etc., or adding letters of "DON'T COPY," for example. With this arrangement, the image processing apparatus 300 can protect a straight output of the image data read by the scanner from the original image 101 when the original image 101 is determined to be an anti-copy document. When the original image 101 is determined to be an ordinary document and not an anti-copy document, the image processing apparatus 300 transmits the image data as facsimile data.

As an alternative, the output controller 213 may notify the system controller 204 of the determination result when the original document 101 is determined to be an anti-copy document so that the system controller 204 instructs the facsimile controller 301 to prohibit a facsimile output of the image data. With this arrangement, the image processing apparatus 300 can protect the facsimile output of the image data read by the scanner from the original image 101 when the original image 101 is determined to be an anti-copy document.

In an e-mail transmission mode, the output controller 213 sends the image data that underwent the data scrambling operation to the system controller 204 and the system controller 204 instructs the e-mail controller 302 to attach the image data covered with colors such as gray, white, etc., or adding letters of "DON'T COPY," for example, to e-mail and to transmit the e-mail. With this arrangement, the image processing apparatus 300 can protect a straight output of the image data read by the scanner from the original image 101 when the original image 101 is determined to be an anti-copy document. When the original image 101 is determined to be an ordinary document and not an anti-copy document, the image processing apparatus 300 transmits the image data, without being processed through the data scrambling operation, as a file attached to e-mail.

As an alternative, the output controller 213 may notify the system controller 204 of the determination result when the original document 101 is determined to an anti-copy document so that the system controller 204 instructs the e-mail controller 302 to prohibit an output of the image data via e-mail. With this arrangement, the image processing apparatus 300 can protect an output of the image data read by the scanner from the original image 101 through e-mail when the original image 101 is determined to be an anti-copy document.

In a data saving mode for storing image data in the storage unit 206 or transmitting the image data stored in the storage unit 206 to external devices through the external interface 303, the output controller 213 sends the image data that underwent the data scrambling operation to the system controller 204 and the system controller 204 instructs the storage unit 206 to store the image data which is covered with colors such as gray, white, etc., or adding letters of "DON'T COPY," for example. With this arrangement, the image processing apparatus 300 can protect an output of the image data read by the scanner from the original image 101 when the original image 101 is determined to be an anti-copy document. When the original image 101 is determined to be an ordinary document and not an anti-copy document, the image processing apparatus 300 stores the image data which has not processed through the data scrambling operation.

As an alternative, the output controller 213 may notify the system controller 204 of the determination result when the original document 101 is determined to be an anti-copy document so that the system controller 204 instructs the storage unit 206 to prohibit storage of the image data. With this arrangement, the image processing apparatus 300 can protect an output of the image data read by the scanner from the original image 101 when the original image 101 is determined to be an anti-copy document.

As described above, the image processing apparatus 300 can protect a straight output of the image data when the original image 101 is determined to be an anti-copy document.

Next, an exemplary structure of an image processing apparatus 300a according to another preferred embodiment of the present invention is explained with reference to FIG. 28. As described above, the image processing apparatus 300 of FIG. 27 achieves the copy protection operation using hardware resources to detect the anti-copy document and to arrange the copy protection based on this detection result. One difference between the image processing apparatus 300a of FIG. 27 from the image processing apparatus 300 of FIG. 28 is the use of software resources for detecting an anti-copy document and performing the copy protection.

Figure 28:
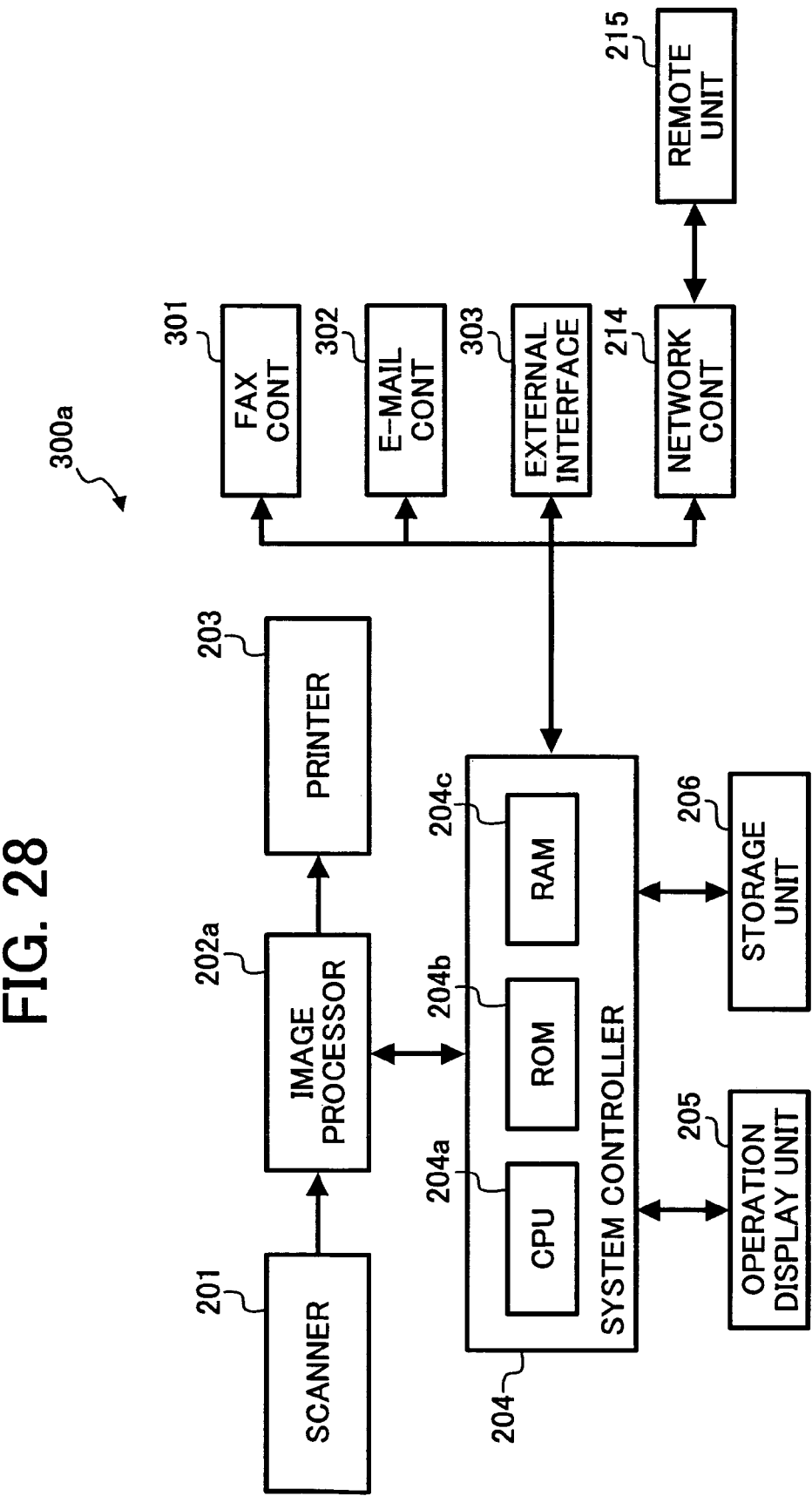
FIG. 28 is a schematic block diagram of another image processing apparatus according to an exemplary embodiment of the present invention.

As shown in FIG. 28, the image processing apparatus 300a includes the scanner 201, an image processor 202a, the printer 203, the system controller 204, the operation display unit 205, and the storage unit 206. Amongst these components, the scanner 201, the printer 203, the system controller 204, the operation display unit 205, and the storage unit 206 are equivalent to those shown in FIG. 6. Unlike the image processor 202 of FIG. 27, the image processor 202a of FIG. 28 does not include the information extractor 212 (which includes the background dot pattern detector 212a and the anti-copy document detector 212b). In addition, a copy protection computer program is installed as a firmware in the ROM 204b of the system controller 204. As an alternative, such copy protection computer program may be installed in the storage unit 206 (e.g., a hard disc drive) connected to a micro computer configured by the CPU 204a, the ROM 204b, and the RAM 204c. In this case, the computer program can be loaded to the RAM 204c and is activated when the image processing apparatus 300a is powered. Accordingly, in the image processing apparatus 300a, the system controller 204 is a main unit to control the copy protection operation according to the copy protection program prestored in either the ROM 204b or the storage unit 206.

Figure 29:
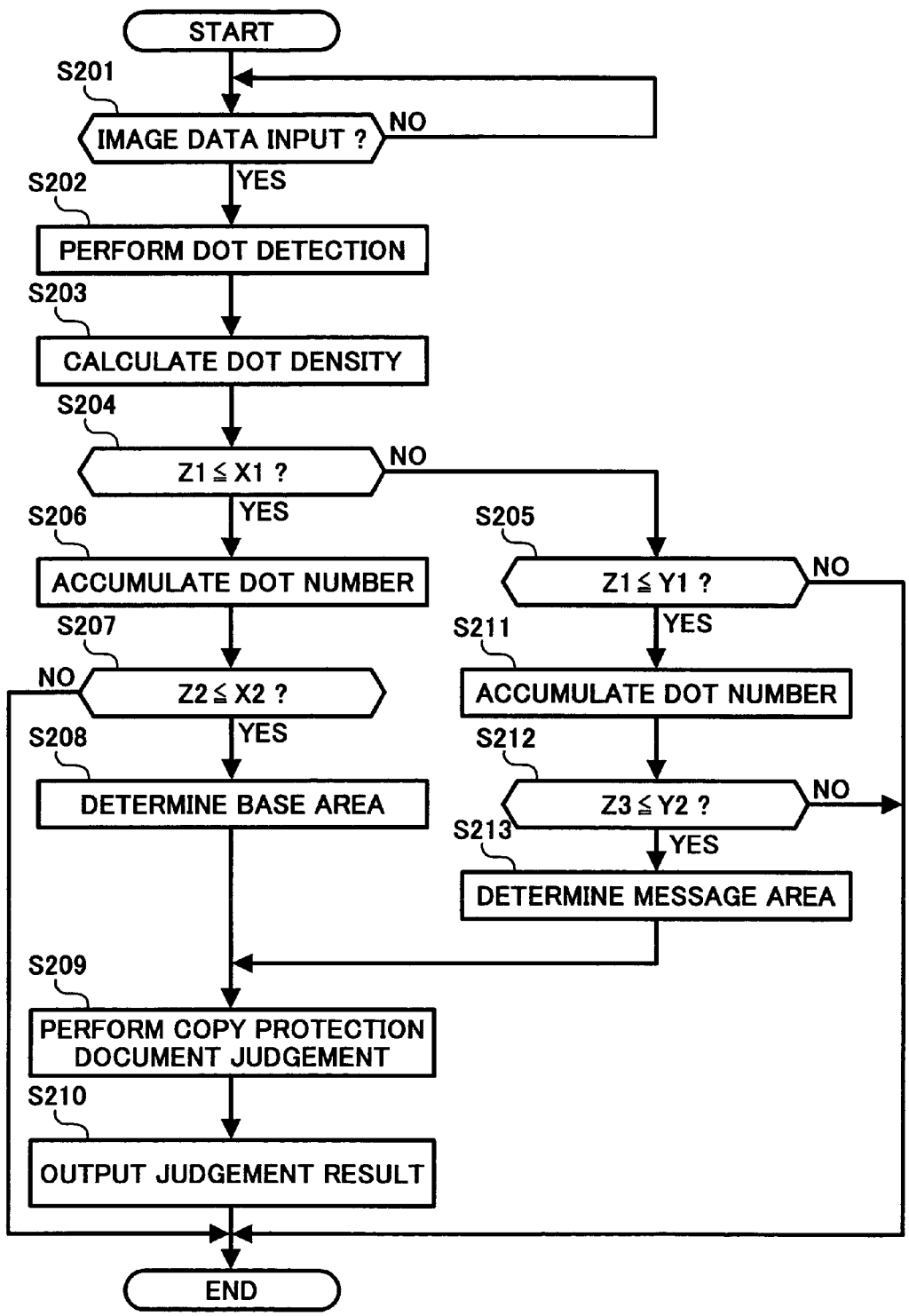
FIG. 29 is a flowchart for explaining an exemplary procedure of an anti-copy detection operation performed by the image processing apparatus of FIG. 28.

Referring to FIGS. 29A and 29B, an exemplary procedure of the copy protection operation performed by the image processing apparatus 300a is explained. In Step S201, the CPU 204a of the system controller 204 repeatedly checks whether image data read from the original image 101 by the scanner 201 is input to the image processor 202. This check operation is performed at intervals of a predetermined time. When the CPU 204a determines that image data is input and the check result of Step S201 becomes YES, the CPU 204a digitizes and detects the dots 106 from the image data, in Step S202. An actual detection method may be one of various conventional methods for detecting images such as a pattern matching method. Then, in Step S203, the CPU 204a calculates a dot density Z1 in a specific unit area of the detected dots 106.

In this embodiment, the storage unit 206 stores data including a first base area threshold value X1, a second base area threshold value X2, a first message area threshold value Y1, and a second message area threshold value Y2. The first base area threshold value X1 is a value used as a permissible value in an identification determination relative to a dot density in a specific unit area of the base area 104 detected in the background dot pattern 103. The second base area threshold value X2 is a value used as a permissible value in an identification determination relative to a dot number in a specific unit area of the base area 104 in the background dot pattern 103. The first message area threshold value Y1 is a value used as a permissible value in the identification determination relative to a dot density in a specific unit area of the message area 105 in the background dot pattern 103. The second message area threshold value Y2 is a value used as a permissible value in the identification determination relative to a dot number in a specific unit area of the message area 105 in the background dot pattern 103. These threshold values are transferred from the storage unit 206 to the RAM 204c together with a part or whole of the image processing program at a boot-up of the image processing program.

In Step S204, the CPU 204a determines whether the dot density Z1 in a specific unit area of the dots 106 detected in Step S202 is smaller than the first base area threshold value X1, stored in the RAM 204c, with respect to the dot density of the base area 104 included in the background dot pattern 103. The CPU 204a continues to Step S205, when the CPU 204a determines that the dot density in a specific unit area of the dots 106 detected in Step S202 is not smaller than the first base area threshold value X1 (i.e., the determination result of Step S204 becomes NO). In Step S205, the CPU 204a determines whether the dot density Z1 in a specific unit area of the dots 106 detected in Step S202 is smaller than the first message area threshold value Y1, stored in the RAM 204c, with respect to the dot density of the message area 105 included in the background dot pattern 103.

If at Step 204, the CPU 204a determines that the dot density Z1 in a specific unit area of the dots 106 detected in Step S202 is smaller than the first base area threshold value X1 and the determination result of Step S204 becomes YES, the CPU 204a performs a dot number calculation to accumulate the number of the detected dots 106, in Step S206. As a result of the accumulation, an accumulated dot number Z2 is generated and is stored in a registration memory area of the RAM 204c, for example. Then, in Step S207, the CPU 204a determines whether the accumulated dot number Z2 is smaller than the second base area threshold value X2, stored in the RAM 204c, with respect to the dot number in the base area 104 of the background dot pattern 103. When the accumulated dot number Z2 is determined to be smaller than the second base area threshold value X2 and the determination result of Step S207 becomes YES, the CPU 204a judges that the base area 104 of the background dot pattern 103 exists, in Step S208. Based on this determination result, the CPU 204a conducts an anti-copy document determination, in Step S209. Then, in Step S210, the CPU 204a outputs a result of the anti-copy document determination.

When, at Step 207 the accumulated dot number Z2 is determined to be not smaller than the second base area threshold value X2 and the determination result of Step S207 becomes NO, the CPU 204a judges that the base area 104 of the anti-copy background dot pattern 103 does not exist and ends the process.

In Step S205, when the dot density Z1 in a specific unit area of the dots 106 detected in Step S202 is smaller than the first message area threshold value Y1 and the determination result thereof becomes YES, the CPU 204a proceeds the process to Step S211. In Step S211, the CPU 204a performs a dot number calculation to accumulate the number of the detected dots 106. As a result of the accumulation, an accumulated dot number Z3 is generated and is stored in a registration memory area of the RAM 204c, for example. Then, in Step S212, the CPU 204a determines whether the accumulated dot number Z3 is smaller than the second message area threshold value Y2, stored in the RAM 204c, with respect to the dot number in the message area 105 of the background dot pattern 103. When the accumulated dot number Z3 is determined to be smaller than the second message area threshold value Y2 and the determination result of Step S212 becomes YES, the CPU 204a judges that the message area 105 of the background dot pattern 103 exists, in Step S213. Based on this judgment result, the CPU 204a conducts the anti-copy document determination in Step S209, and outputs this determination result in Step S210.

The CPU 204a will end the process in either case when the dot density Z1 in a specific unit area of the dots 106 detected in Step S202 is not smaller than the first message area threshold value Y1 and the determination result thereof becomes NO, or when the accumulated dot number Z3 is determined to be not smaller (i.e., larger) than the second message area threshold value Y2 and the determination result of Step S212 becomes NO.

In Step S209, the CPU 204a performs the anti-document determination with reference to a predetermined standard. This standard can be, for example, established by being input as parameters through the operation panel 205 and is stored in a nonvolatile memory and a battery-backed-up memory included in the RAM 204c. With the thus-prepared standard, in one example, the anti-copy document determination process of the CPU 204a in Step S209 determines that the present document is an anti-copy document like a confidential document when determining that one of the base area 104 and the message area 105 of the background dot pattern 103 exists in the original image 101 read by the scanner 201. In another example, the anti-copy document determining process of the CPU 204a determines that the present document is an anti-copy document like a confidential document when determining that both of the base area 104 and the message area 105 of the background dot pattern 103 exist in the original image 101 read by the scanner 201.

Thus, the present embodiment detects from the image data the background dot pattern 103 embedded in the background image which is included in the image data of the original image 101. Then, the present embodiment compares the detected background dot pattern 103 to the prestored reference background dot pattern, thereby performing the background dot pattern identification determination. With this operation, the present embodiment can determine whether it is permissible to output the image data of the original image 101, regardless of the types of the original image.

Figure 30:
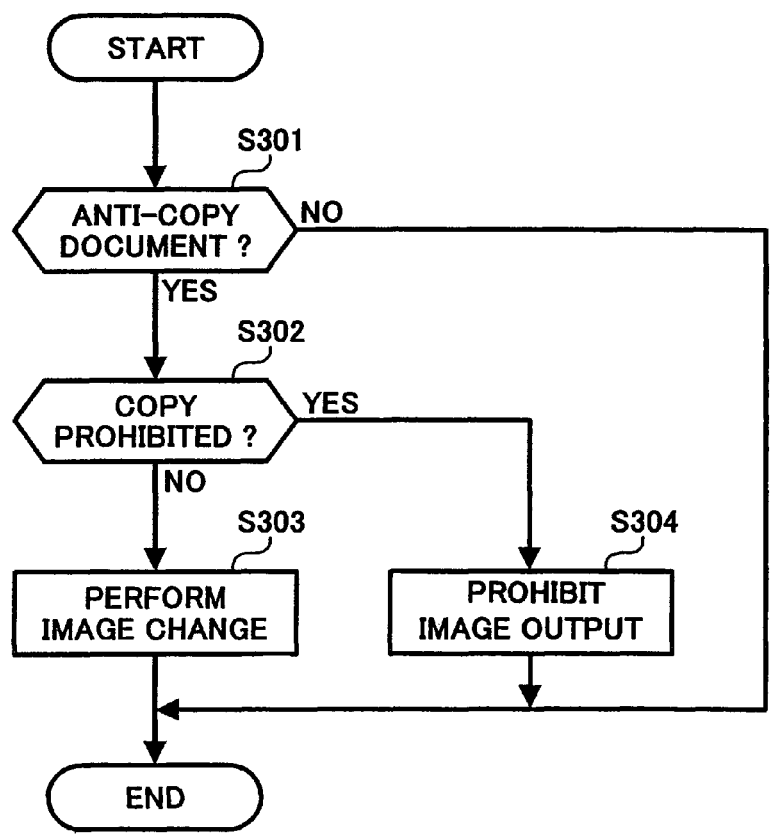
FIG. 30 is a flowchart for explaining an exemplary procedure of prohibiting reproducing an anti-copy document performed by the image processing apparatus of FIG. 28.

FIG. 30 illustrates an exemplary procedure of an operation for prohibiting an output of the image data that is determined to be an anti-copy document. In this case, it is presumed that the image processing apparatus 300a is in a print mode such that image data read from the original image 101 by the scanner 201 is directed to the printer 203 for reproduction. In Step S301 of FIG. 30, the CPU 204a determines whether image data of the original image 101 read by the scanner 201 is an anti-copy document. When image data of the original image 101 read by the scanner 201 is determined to be not an anti-copy document in Step S301, the operation ends. When image data of the original image 101 read by the scanner 201 is determined to be an anti-copy document in Step S301, the operation proceeds to Step S302 in which the CPU 204a determines whether to prohibit reproduction of the image data by the printer 203 in accordance with a predetermined instruction which can be entered through the operation display unit 205.

When reproduction of the image data by the printer 203 is determined not to be prohibited and the determination result in Step S302 is NO, the CPU 204a proceeds to Step S303 to perform a data scrambling operation for changing an image of the detected anti-copy document by covering the image of the detected anti-copy document with colors such as gray, white, etc., or adding letters of "DON'T COPY," for example. After the process of Step S303, the CPU 204a ends the operation.

When the printer 203 receives a print instruction with the image data undergone the data scrambling operation performed in Step S203, the printer 203 reproduces an image covered with colors such as gray, white, etc., or adding letters of "DON'T COPY," for example, which is no longer legible.

Thus, the original image 101 read by the scanner 201 and determined as an anti-copy document by the CPU 204a is secured from being exposed to outside even though it is reproduced by the printer 203.

When reproduction of the image data by the printer 203 is determined to be prohibited and the determination result in Step S302 is YES, the CPU 204a proceeds to Step S304 to stop reproduction of the image data of the original image 101 read by the scanner. Thus, the original image 101 read by the scanner 201 and determined to be an anti-copy document by the CPU 204a is secured from being reproduced by the printer 203. After the process of Step S304, the CPU 204a ends the operation.

The above operation is in the print mode in that image data read from the original image 101 by the scanner 201 is directed to the printer 203 for reproduction. The image processing apparatus 300a is configured to conduct a similar operation also when choosing one of the various other modes; faxing, e-mailing, file transferring, data saving and transmitting, etc.

In this way, the image processing apparatus 300a can protect a straight output of the image data when the original image 101 is determined as an anti-copy document.

Figure 31:
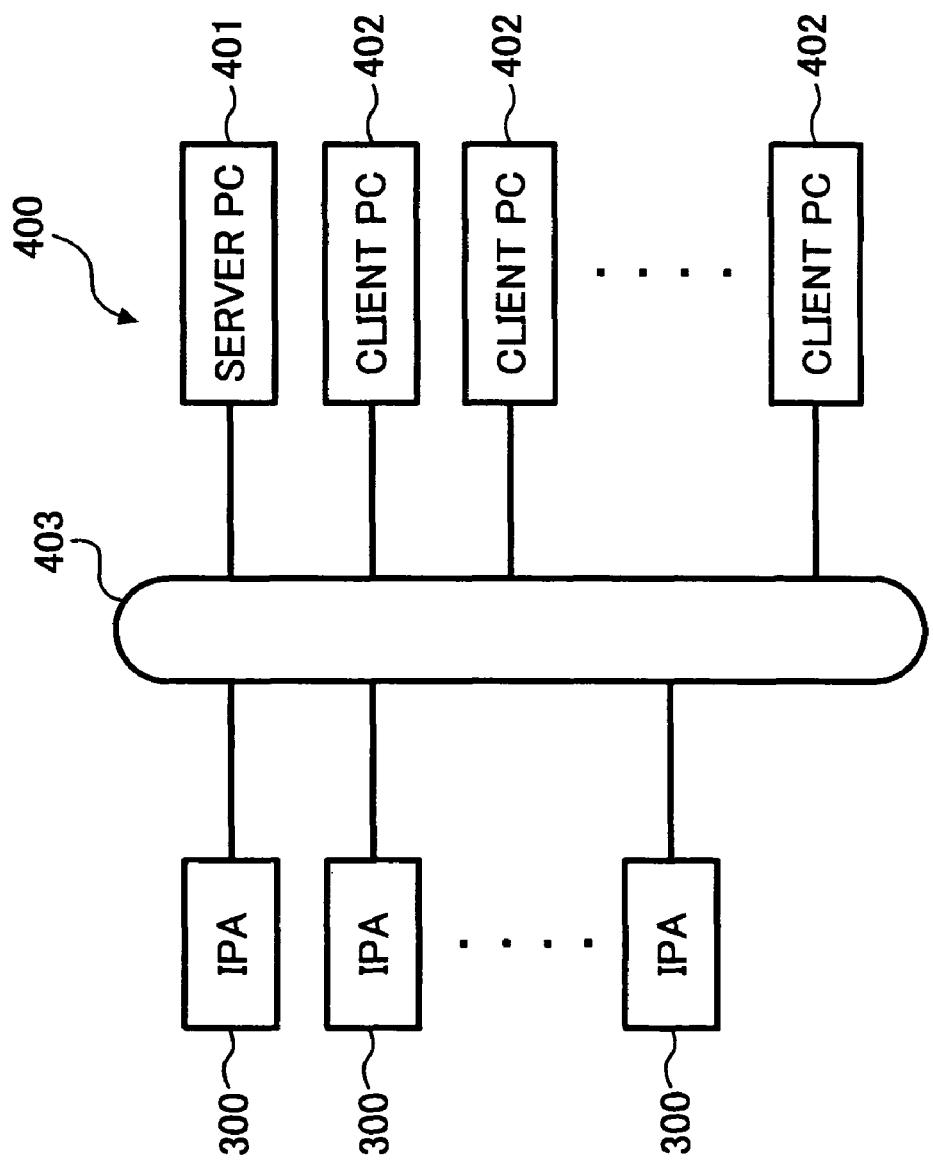
FIG. 31 is a schematic block diagram of an image processing network system according to an exemplary embodiment of the present invention.

Next, an image processing network system 400 according to an exemplary embodiment of the present invention is explained with reference to FIG. 31. The image processing network system 400 is configured as a server client system, having an exemplary structure including, as shown in FIG. 31, a plurality of image processing apparatuses 300 (each indicated as an IPA in FIG. 31), a server PC (personal computer) 401, a plurality of client PCs 402, and a communications network 403 which may be a LAN, a WAN, etc. In place of the plurality of image processing apparatuses 300, it is possible to put a plurality of the image processing apparatuses 300a. The server PC 401 and the plurality of client PCs 402 are general purpose personal computers, and one of the plurality of client PCs 402 is used by an administrator as an administrator computer. In this image processing network system 400, each of the plurality of image processing apparatuses 300 is connected to the communications network 403 through the network controller 214 (see FIG. 27). The remote terminal 215 of FIG. 27 corresponds to any one of the plurality of client PCs 402.

Each one of the image processing apparatuses 300 connected to the image processing network system 400 is capable of performing the above-described operations of the anti-copy document determination and the reproduction prohibition as a stand-alone machine. That is, each image processing apparatus 300 instructs the image processor 202 to carry out the processes; checking whether the image data read by the scanner 201 from the original image 101 includes a pattern corresponding to the reference background dot pattern 103, determining whether the original image 101 includes a confidential image pattern when the image data is checked as including such pattern, and notifying the system controller 204 and the output controller 213 of a determination result. Subsequently, the system controller 204 and the output controller 213 take required actions with respect to the prohibition of reproduction of the original image 101 determined as a copy-prohibited document.

In addition to this stand-alone operation, the image processing apparatus 300 can operate as a part of the image processing network system 400 with respect to the anti-copy document determination operation. That is, the image processing apparatus 300 requests the server PC 401 to perform the anti-copy document determination operation and obtains a determination result of the anti-copy document determination from the server PC 401. Based on the determination result obtained from the server PC 401, the image processing apparatus 300 instructs the system controller 204 and the output controller 213 to take required actions with respect to the prohibition of reproduction of the original image 101 determined to be a copy-prohibited document.

In the anti-copy document determination by the image processing apparatus 300, the background dot pattern 103 used as a reference representative of pattern characteristics can be changed in a different shape; for example, a cross mark containing characteristic quantities of a line length and an intersection angle. As an alternative to the shapes, a color of the background image in an original image can be used as a reference representative of quantity characteristics. For example, a blue color is the one easily obtained in a case when the original image is read by the scanner 201.

The output controller 213 executes operations exactly in accordance with the instructions given by the system controller 204 based on the result of the anti-copy document determination operation performed by the anti-copy document determiner 212b (see FIG. 24). More specifically, the output controller 213 executes various operations such as prohibiting reproduction of an anti-copy document by the printer 203, notifying the administrator's client PC 402, through the network controller 214, of an event that an anti-copy document is read by the scanner 201, and so on in accordance with the instructions given by the system controller 204 when the original image 101 read by the scanner 201 is determined as a specific document to be handled carefully in a predetermined special method.

The image processing apparatus 300 is provided with a variety of predetermined special handling methods corresponding to various kinds of conditions associated with the anti-copy document determination; for example, ranks of confidentiality in anti-copy documents, ranks of reading accuracy by the scanner, differences in desired handling manners for different cases, etc., and their combinations. This provides a great deal of flexibility to the operation conducting the anti-copy document determination, in contrast to the case of the image processing apparatus 300 of FIG. 27, in which the predetermined special handling method is merely prepared to treat a result of the anti-copy document determination which is one way or another, that is, whether the original image 101 is an anti-copy document or not.

Figure 32:
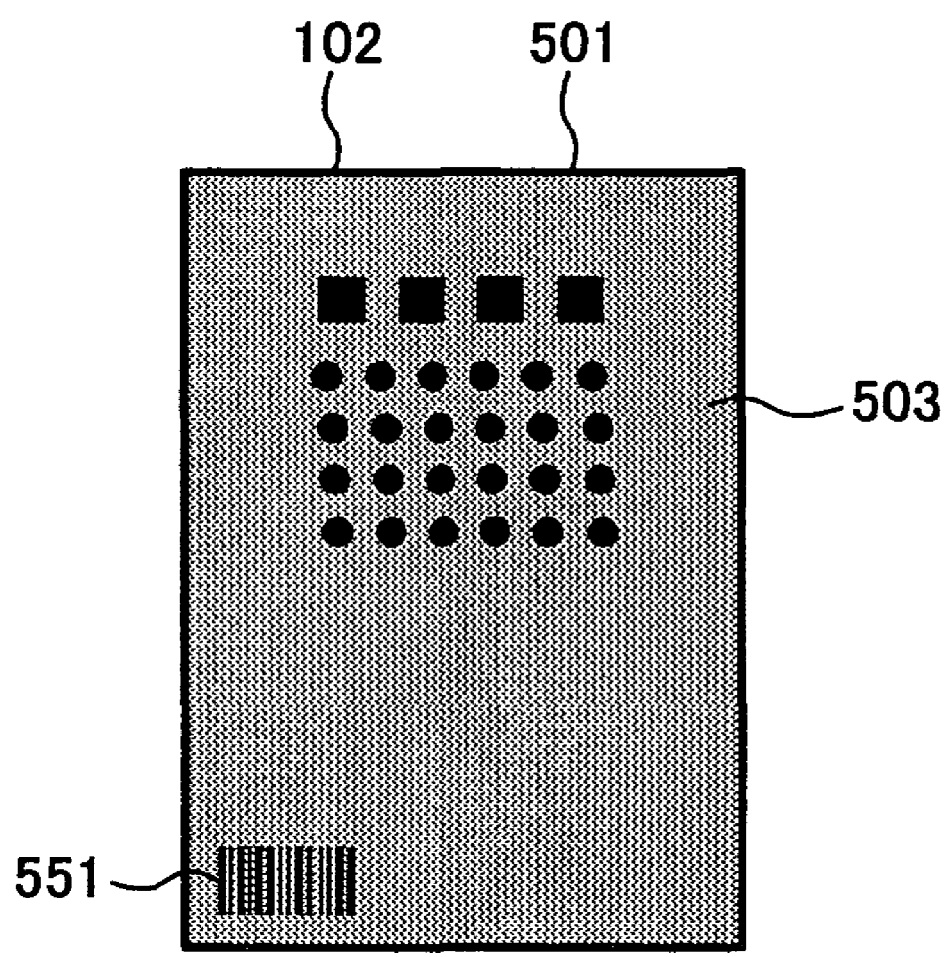
FIG. 32 is an illustration for explaining an exemplary original sheet printed on an original sheet with a background dot pattern and a barcode.

FIG. 32 shows the original sheet 102 on which an original image 501, a background dot pattern 503, and a barcode 551 are printed. The barcode 551 is one example of a data code used as a form of information representation, which is pre-printed or printed after the original image 501 and the background dot pattern 503 are printed on the original sheet 102, at a predetermined position relative to the original image 501.

In the image processing apparatus 300, the ROM 204b of the system controller 204 previously stores a barcode interpreting program and associated cross reference lookup table. The barcode interpreting program forms a part of an image processing program applied to this image processing apparatus 300. The barcode interpreting program makes the CPU 204a execute operations to read and analyze the barcode 551 from the image data of the original image 501 read by the scanner 201. More specifically, the image data of the original image 501 read by the scanner 201 is sent to the anti-copy document determiner 212b and to the system controller 204 and is stored in the RAM 204c or the storage unit 206. Then, the barcode interpreting program makes the CPU 204a read the barcode 551 located at the predetermined position from the image data of the original image 501 stored in the RAM 204c or the storage unit 206.

Figure 33A:
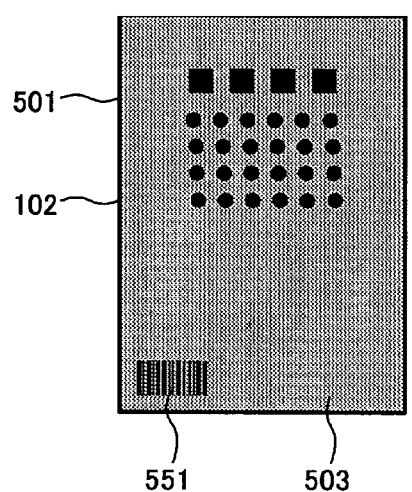
FIGS. 33A-33D and 34 are illustrations for explaining the original sheet in different orientations.
Figure 33B:
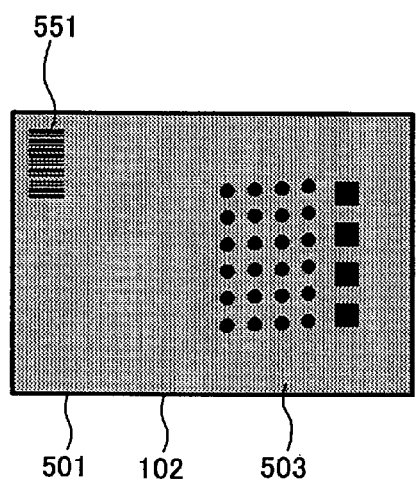
Figure 33C:
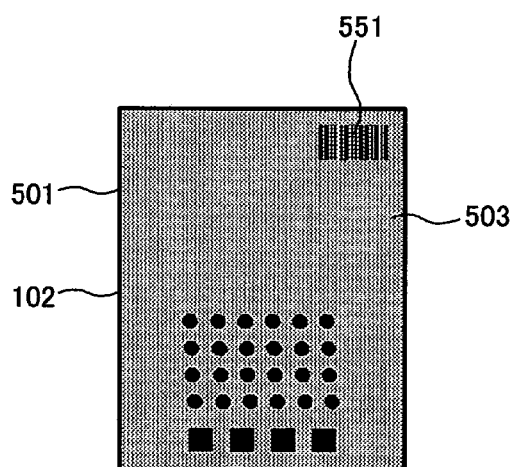
Figure 33D:
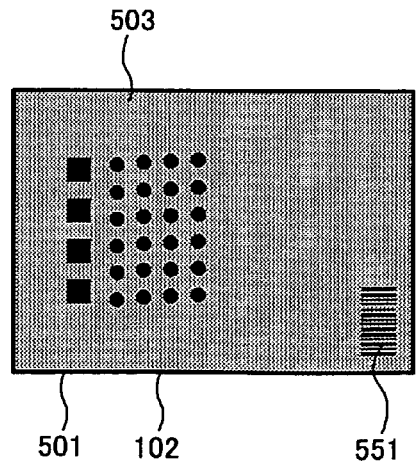
Figure 34:
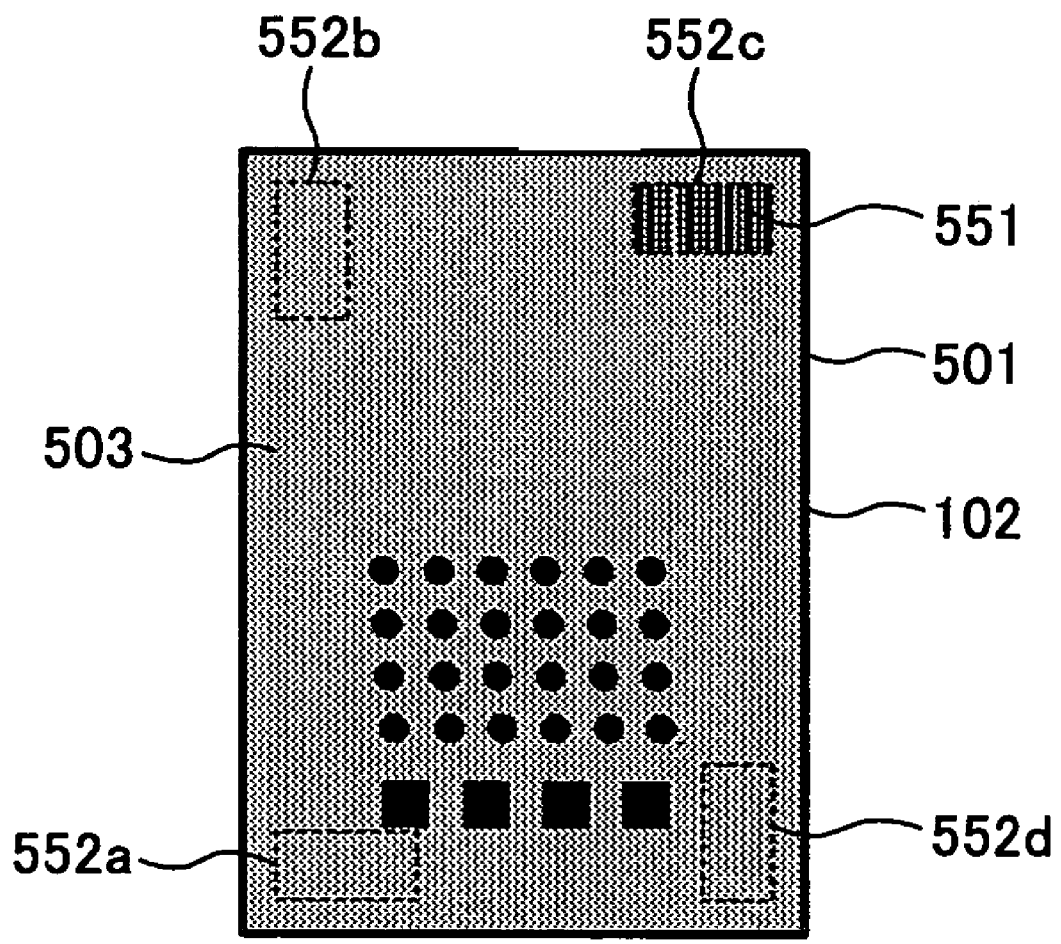

In this process, orientations of the original sheet 102 need to be considered. FIGS. 33A-33D show positions of the original sheet 102 with a 90-degree difference from each other, among which FIG. 33A shows a correct orientation. The barcode interpreting program makes the CPU 204a read out four data blocks 552a-552d from the image data, as illustrated in FIG. 34. The CPU 204a analyzes data of these data blocks 552a-552d to determine which data block includes specific code data, that is the barcode 551.

The CPU 204a determines characteristic data of the barcode 551 such as thickness and spaces of bars based on binary data read of bar-shaped images read from each of the four data blocks, and decodes such characteristic data of the barcode 551 so as to extract a series of alphanumerical letter images. Accordingly, the CPU 204a determines that the data block from which a series of alphanumerical letter images are found is a data block that properly contains the barcode 551. In addition, if a series of alphanumerical letter images are extracted, they are the information the barcode 551 represents, which means that the barcode 551 is decoded. Subsequently, the CPU 204a refers to the cross reference lookup table previously stored in the ROM 204b for defining a relationship between a series of alphanumeric letters and specific information, thereby obtaining the information represented by the barcode 551 printed on the original sheet 102.

In this way, the image processing apparatus 300 achieves the extraction of the barcode 551 from the image data of the original image 501 read by the scanner 201 with the barcode interpreting program and the cross reference lookup table stored in the ROM 204b.

As an alternative to this configuration, the image processing apparatus 300 may request an external terminal such as the server PC 401, for example, to send to the image processing apparatus 300 the barcode interpreting program upon determining that an anti-copy document is read by the scanner 201, for example. As one example, the barcode interpreting program can be sent from the server PC 401 to the image processing apparatus 300 in a form of JAVA (JAVA is a trademark) applet.

An another alternative, the image processing apparatus 300 may request an external terminal such as the server PC 401, for example, to analyze a series of alphanumeric letter images when reading the barcode 551 and extracting the series of alphanumeric letter images from the barcode 551 and to send to the image processing apparatus 300 resultant information represented by the barcode 551.

In this embodiment, the barcode 551 is exemplified as a form of information representation. As an alternative to this, a two-dimensional code may be used, which is particularly suitable when a great amount of information is needed to be contained in a code. It is also possible to have multiple barcodes, based on a barcode such as the barcode 551, being piled with one on another.

The information represented by the barcode 551 and the predetermined special operations performed by the output controller 213 or the system controller 204 are explained with more specific examples. In a first example of the predetermined special operations, the barcode 551 is provided with information indicative of a confidentiality level. Such confidentiality level is recognized by reading the barcode 551 from the image data of the original image 501 when a specific document such as a confidential document is read by the scanner 201.

Upon recognizing the confidential level of a confidential document, the output controller 213 or the system controller 204 conducts special handling operations for the confidential document in the following exemplary way. For example, the image data of a confidential document is not allowed to be reproduced as an image by the printer 203 when the confidentiality of the confidential document is determined as being at a first level. The image data of a confidential document is allowed to be reproduced by the printer 203 as an image but with a mark on the image indicative of confidentiality when the confidentiality of the confidential document is determined as being at a second level. The image data of a confidential document is allowed to be reproduced by the printer 203 as an image but unauthorized reading of such confidential document by the scanner 201 is notified to an administrator of the client PC 402 by e-mail, for example, when the confidentiality of the document is determined as being at a third level. In this case of the third level, in which e-mail notification is made to the administrator of the client PC 402, it is useful for tracing back if the e-mail is attached with information indicative of time when reading of a specific document is made, monitoring information from a monitoring apparatus (not shown), and so forth. The monitoring apparatus is, for example, arranged to monitor with a CCD (charge coupled device) camera a person who operates the image processing apparatus 300 and sends a captured image of a person operating the image processing apparatus 300 to the image processing apparatus 300 so that the output controller 213 or the system controller 204 can arrange e-mail to contain the captured image.

In a second example of the predetermined special operations, the output controller 213 or the system controller 204 selects appropriate one of the predetermined special operations based not only on the information obtained from the barcode 551 indicative of a confidentiality level but also on specific information about a user of the image processing apparatus 300. The specific information about a user of the image processing apparatus 400 can easily be obtained by requesting an input of user information, a password, etc. through the operation display unit 205 or the remote terminal 215. As an alternative, it is also possible to include the specific information about a user of the image processing apparatus into the barcode 551. In this case, a user is provided with a specific original sheet (e.g., the original sheet 102) preprinted with a barcode (e.g., the barcode 551) unique to others.

Upon thus recognizing the confidential level of a confidential document and the user information, the output controller 213 or the system controller 204 conducts special handling operations for the confidential document in the following exemplary way. For example, the output controller 213 or the system controller 204 accepts a request from a specific user for reproduction of the image data of a confidential document by the printer 203 but rejects the same request from another specific user when the confidentiality of the confidential document is determined as being at a first level. The output controller 213 or the system controller 204 accepts a request from a specific user for reproduction of the image data of a confidential document by the printer 203 but rejects the same request from another specific user when the confidentiality of the confidential document is determined as being at a second level. The output controller 213 or the system controller 204 rejects a request from any user for reproduction of the image data of a confidential document by the printer 203 when the confidentiality of the confidential document is determined as being at a third level. In this case of the third level, the output controller 213 or the system controller 204 may notify the administrator of the client PC 402 with e-mail that unauthorized reading of a specific document such as a confidential document is conducted. In this case of the third level, in which e-mail notification is made to the administrator of the client PC 402, it is useful for trace back if the e-mail is attached with information indicative of time when reading of a specific document is made, monitoring information from a monitoring apparatus (not shown), and so forth. The monitoring apparatus is, for example, arranged to monitor with a CCD (charge coupled device) camera a person who operates the image processing apparatus 300 and sends a captured image of a person operating the image processing apparatus 300 to the image processing apparatus 300 so that the output controller 213 or the system controller 204 can arrange e-mail to contain the captured image.

In a third example of the predetermined special operations, the barcode 551 is configured to include an identification of document but not the information indicative of a confidentiality level. That is, in this example, each specific document is given unique identification information. With this configuration, the output controller 213 or the system controller 204 can conduct the predetermined special operations in accordance with the type of the specific document identified by the identification information.

In this way, the image processing apparatus 300 can conduct a variety of the special handling operations for the so-determined anti-copy document based on the information contained in the barcode 551.

In connection with management of image data before transmitting the image data to the printer 203, the image processing apparatus 300 does not apply a system in which the image data is processed by the image adjuster 211 of the image processor 202 and, immediately after an ordinary image treatment executed by the image adjuster 211, the printer 203 is driven and the image data is reproduced. That is, in the image processing apparatus 300, the information extractor 212 mandatorily executes the identifying operation for identifying a document under process before reproduction of the document by the printer 203.

The ordinary image treatment by the image adjuster 211 and the identifying operation by the information extractor 212 may be executed simultaneously or at shifted time. When they are executed at the shifted time, the image data is temporarily stored in an image memory (not shown) to cause a delay in transmitting the image data to the image adjuster 211 so that the identifying operation by the information extractor 212 precedes the ordinary image treatment.

In one example, the system controller 204 preferably executes the operation of extracting the barcode 551 from the image data and the subsequent operations when the anti-copy document determiner 212b determines that unauthorized reading of a specific document such as a confidential document is conducted. This arrangement is suitable specifically for a case in which the information extractor 212 executes the document identification operation at a relatively fast speed and the information extraction at a relatively low speed. This is because the information extraction that takes a relatively longer time period is preferably limited to a small number of cases as possible. This leads to a time savings of an entire operation of the image processing apparatus 300. On the other hand, it is possible to configure the image processing apparatus 300 to conduct the information extraction each time, regardless of the results of the document identification. In this case, when the anti-copy document determiner 212b determines that unauthorized reading of a specific document such as a confidential document is conducted, the results of the information extraction which have been produced are utilized.

It is possible that at least one of the extraction of the barcode 551 and the analysis of the extracted barcode 551 is not properly executed. In this case, the image processing apparatus 300 is configured to conduct a predetermined operation for sending an instruction to the output controller 213 to prohibit reproduction of the image data under process by the printer 203, or to the system controller 204 to send a notification with e-mail to an administrator of the client PC 402. This is because, when at least one of the extraction of the barcode 551 and the analysis of the barcode 551 is not properly executed, this does not negate the fact that the anti-copy document determiner 212b determines as that an unauthorized reading of a specific document such as a confidential document occurred and therefore it is desirable to perform a safeguard.

Figure 35A:
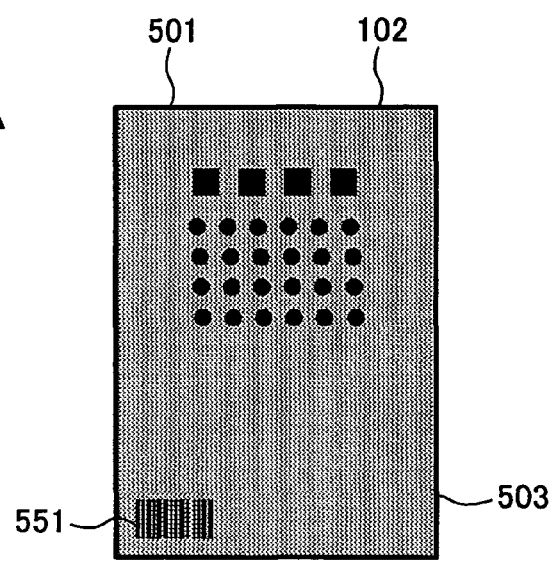
FIGS. 35A-35C are illustrations for explaining a variety of combinations of a background dot pattern and a barcode on an original image to be printed on an original sheet.
Figure 35B:
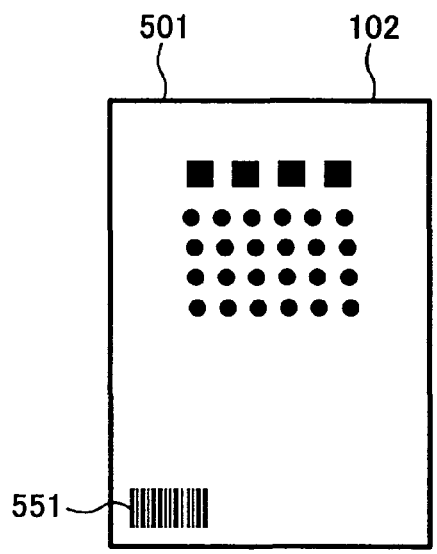
Figure 35C:
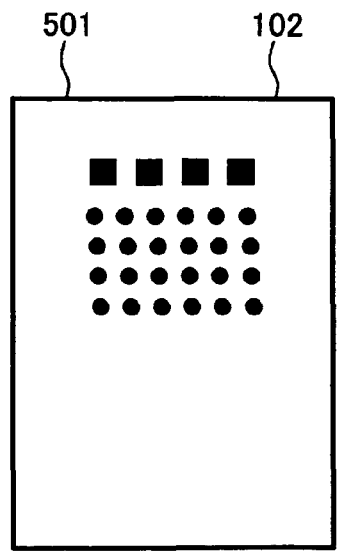

As another example, the system controller 204 may execute the extraction of the barcode 551 and the subsequent operations even when the anti-copy document determiner 212b determines that unauthorized reading of a specific document such as a confidential document was not conducted. This is because there are a variety of image combinations in the original image 101. In other words, an original image 501a may include reference patterns such as the background dot pattern 103 and the barcode 551, as illustrated in FIG. 35A, or an original image 501b may include only a reference pattern of the barcode 551, as illustrated in FIG. 35B, or an original image 501c may include no reference patterns, as illustrated in FIG. 35C. For example, when the original image 501a of FIG. 35A is read, the image processing apparatus 300 can instruct the output controller 213 or the system controller 204 to conduct an appropriate specific operation in accordance with a predetermined procedure defined according to a combination of no reference pattern and the barcode 551.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed as new and desired to protected by Letters Patent of the United States is:

1. An image processing apparatus capable of performing at least one of a function of copying, faxing, file transfer e-mailing, image-data network transmission, and image data accumulation, the image processing apparatus comprising:
   a memory configured to store information specifying a basic dot pattern including a plurality of dots;
   an image reading mechanism configured to read an original image having image data embedded with a composite pattern, wherein the composite pattern is generated by:
   1) providing two basic patterns including a first basic pattern, and a second basic pattern generated by turning the first basic pattern by a specific degree of angle; and 2) combining the first basic pattern and the second basic pattern such that at least one of the plurality of dots included in the first basic pattern is exactly superimposed on at least one of the plurality of dots included in the second basic pattern;
   a dot pattern detecting mechanism configured to extract a dot pattern that is identical to the basic dot pattern specified by the information stored in the memory from the composite pattern embedded in the original image as a detected dot pattern;

a dot pattern determining mechanism configured to determine whether the original image is an anti-copy document based on the detected dot pattern to generate a determination result; and an output regulating mechanism configured to control the at least one function of copying, faxing, file transfer e-mailing, image-data network transmission, and image data accumulation according to the determination result indicating whether the original image is an anti-copy document.

2. The image processing apparatus of claim 1, wherein the composite pattern includes a plurality of composite patterns embedded throughout a background section of the original image.

3. The image processing apparatus of claim 2, wherein the original image is embedded with a plurality of dummy dots in addition to the plurality of composite patterns so as to increase evenness of a dot density of a plurality of dots embedded to the original image.

4. The image processing apparatus of claim 3, wherein the output regulating mechanism prohibits output of the image data of the original image when the determination result indicates that the original image is an anti-copy document.

5. The image processing apparatus of claim 3, wherein the output regulating mechanism performs a data scrambling operation to the image data of the original image to generate a processed image in which information contained in the image data of the original image is concealed when the determination result indicates that the original image is an anti-copy document, and outputs the processed image using at least one of the function of copying, faxing, file transfer e-mailing, image-data network transmission, and image data accumulation.

6. An image processing method performed by an image processing apparatus capable of performing at least one of a function of copying, faxing, file transfer e-mailing, image-data network transmission, and image data accumulation, the image processing method comprising:

storing information specifying a basic dot pattern including a plurality of dots in a memory;

reading an original image having image data embedded with a composite pattern, wherein the composite pattern is generated by 1) providing two basic patterns including a first basic pattern, and a second basic pattern generated by turning the first basic pattern by a specific degree of angle; and 2) combining the first basic pattern and the second basic pattern such that at least one of the plurality of dots included in the first basic pattern is exactly superimposed on at least one of the plurality of dots included in the second basic pattern;

extracting a dot pattern that is identical to the basic dot pattern specified by the information stored in the memory from the composite pattern embedded in the original image as a detected dot pattern;

determining whether the original image is an anti-copy document based on the detected dot pattern to generate a determination result; and controlling the at least one function of copying, faxing, file transfer e-mailing, image-data network transmission, and image data accumulation according to the determination result indicating whether the original image is an anti-copy document.

7. The image processing method of claim 6, wherein the composite pattern includes a plurality of composite patterns embedded throughout a background section of the original image.

8. The image processing method of claim 7, wherein the original image is embedded with a plurality of dummy dots in addition to the plurality of composite patterns so as to increase evenness of a dot density of a plurality of dots embedded to the original image.

9. The image processing method of claim 8, wherein the step of controlling includes:

prohibiting output of the image data of the original image when the determination result indicates that the original image is an anti-copy document.

10. The image processing method of claim 8, wherein the step of controlling includes:

performing a data scrambling operation to the image data of the original image to generate a processed image in which information contained in the image data of the original image is concealed when the determination result indicates that the original image is an anti-copy document; and outputting the processed image using at least one of the function of copying, faxing, file transfer e-mailing, image-data network transmission, and image data accumulation.

11. A computer program product stored on a non-transitory computer readable storage medium for carrying out an image processing method, when executed on an image processing apparatus capable of performing at least one of a function of copying, faxing, file transfer e-mailing, image-data network transmission, and image data accumulation, the method comprising:

storing information specifying a basic dot pattern including a plurality of dots in a memory;

reading an original image having image data embedded with a composite pattern, wherein the composite pattern is generated by 1) providing two basic patterns including a first basic pattern, and a second basic pattern generated by turning the first basic pattern by a specific degree of angle; and 2) combining the first basic pattern and the second basic pattern such that at least one of the plurality of dots included in the first basic pattern is exactly superimposed on at least one of the plurality of dots included in the second basic pattern;

extracting a dot pattern that is identical to the basic dot pattern specified by the information stored in the memory from the composite pattern embedded in the original image as a detected dot pattern;

determining whether the original image is an anti-copy document based on the detected dot pattern to generate a determination result; and controlling the at least one function of copying, faxing, file transfer e-mailing, image-data network transmission, and image data accumulation according to the determination result indicating whether the original image is an anti-copy document.

12. The computer program product of claim 11, wherein the composite pattern includes a plurality of composite patterns embedded throughout a background section of the original image.

13. The computer program product of claim 12, wherein the original image is embedded with a plurality of dummy dots in addition to the plurality of composite patterns so as to increase evenness of a dot density of a plurality of dots embedded to the original image.

14. The computer program product of claim 13, wherein the step of controlling includes:
prohibiting output of the image data of the original image when the determination result indicates that the original image is an anti-copy document.

15. The computer program product of claim 13, wherein the step of controlling includes:
performing a data scrambling operation to the image data of the original image to generate a processed image in which information contained in the image data of the original image is concealed when the determination result indicates that the original image is an anti-copy document; and
outputting the processed image using at least one of the function of copying, faxing, file transfer e-mailing, image-data network transmission, and image data accumulation.

16. A non-transitory computer readable storage medium storing a computer program product for carrying out an image processing method, when executed on an image processing apparatus capable of performing at least one of a function of copying, faxing, file transfer e-mailing, image-data network transmission, and image data accumulation, the image processing method comprising:
storing information specifying a basic dot pattern including a plurality of dots in a memory;
reading an original image having image data embedded with a composite pattern, wherein the composite pattern is generated by 1) providing two basic patterns including a first basic pattern, and a second basic pattern generated by turning the first basic pattern by a specific degree of angle; and 2) combining the first basic pattern and the second basic pattern such that at least one of the plurality of dots included in the first basic pattern is exactly superimposed on at least one of the plurality of dots included in the second basic pattern;
extracting a dot pattern that is identical to the basic dot pattern specified by the information stored in the memory from the composite pattern embedded in the original image as a detected dot pattern;
determining whether the original image is an anti-copy document based on the detected dot pattern to generate a determination result; and
controlling the at least one function of copying, faxing, file transfer e-mailing, image-data network transmission, and image data accumulation according to the determination result indicating whether the original image is an anti-copy document.

17. The non-transitory computer readable storage medium of claim 16, wherein the composite pattern includes a plurality of composite patterns embedded throughout a background section of the original image.

18. The non-transitory computer readable storage medium of claim 17, wherein the original image is embedded with a plurality of dummy dots in addition to the plurality of composite patterns so as to increase evenness of a dot density of a plurality of dots embedded to the original image.

19. The non-transitory computer readable storage medium of claim 18, wherein the step of controlling includes:
prohibiting output of the image data of the original image when the determination result indicates that the original image is an anti-copy document.

20. The non-transitory computer readable storage medium of claim 18, wherein the step of controlling includes:
performing a data scrambling operation to the image data of the original image to generate a processed image in which information contained in the image data of the original image is concealed when the determination result indicates that the original image is an anti-copy document; and
outputting the processed image using at least one of the function of copying, faxing, file transfer e-mailing, image-data network transmission, and image data accumulation.

* * * * *